(12) United States Patent
Kato

(10) Patent No.: US 8,984,509 B2
(45) Date of Patent: Mar. 17, 2015

(54) VIRTUAL MACHINE DISPLAY DEVICE, VIRTUAL MACHINE DISPLAY METHOD, RECORDING MEDIUM, AND INTEGRATED CIRCUIT

(75) Inventor: Kazuomi Kato, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 307 days.

(21) Appl. No.: 13/639,304

(22) PCT Filed: Oct. 19, 2011

(86) PCT No.: PCT/JP2011/005855
§ 371 (c)(1),
(2), (4) Date: Oct. 4, 2012

(87) PCT Pub. No.: WO2012/107975
PCT Pub. Date: Aug. 16, 2012

(65) Prior Publication Data
US 2013/0031552 A1 Jan. 31, 2013

(30) Foreign Application Priority Data

Feb. 9, 2011 (JP) ................................. 2011-025728

(51) Int. Cl.
*G06F 3/048* (2013.01)
*G06F 9/455* (2006.01)
(Continued)

(52) U.S. Cl.
CPC .. *G06F 3/14* (2013.01); *G09G 5/14* (2013.01); *G09G 5/397* (2013.01);
(Continued)

(58) Field of Classification Search
None
See application file for complete search history.

(56) References Cited

U.S. PATENT DOCUMENTS 5,910,180 A * 6/1999 Flory et al. .................... 719/321
7,272,799 B2 9/2007 Imada et al.
(Continued)

FOREIGN PATENT DOCUMENTS

| JP | 2002-318699 | 10/2002 |
|---|---|---|
| JP | 2006-338531 | 12/2006 |
| JP | 2009-157635 | 7/2009 |

OTHER PUBLICATIONS

Humphreys et al. A Distributed Graphics System for Large Tiled Displays. [online] (1999). IEEE., pp. 215-224. Retrieved From the Internet <http://www.evl.uic.edu/cavern/EVL/Schwarz_Nicholas/papers/p215-humphreys.pdf>.*

(Continued)

*Primary Examiner* — Emerson Puente
*Assistant Examiner* — Jonathan R Labud
(74) *Attorney, Agent, or Firm* — Wenderoth, Lind & Ponack, L.L.P.

(57) ABSTRACT

A dummy layer generating/finishing section 1301 generates a dummy layer, in the case where a screen layer of a secure virtual machine 101 is generated. In the case where at least one dummy layer is generated, a display driver switching section 1322 switches the display control to the secure virtual machine 101 for causing a screen data combining section 1331 to combine screen layers. On the other hand, in the case where a dummy layer is not generated, the display driver switching section 1322 switches the display control to a non-secure virtual machine 102 for causing a screen data combining section 1321 to combine screen layers.

13 Claims, 21 Drawing Sheets

(51) Int. Cl.
  *G06F 9/46* (2006.01)
  *G06F 3/14* (2006.01)
  *G09G 5/14* (2006.01)
  *G09G 5/397* (2006.01)

(52) U.S. Cl.
  CPC ....... *G09G 2358/00* (2013.01); *G06F 9/45558* (2013.01); *G06F 2009/45579* (2013.01); *G06F 2009/45587* (2013.01)
  USPC ................ 718/1; 718/100; 718/108; 715/778

(56) References Cited

U.S. PATENT DOCUMENTS

| | | | |
|---|---|---|---|
| 7,681,200 B2 * | 3/2010 | Wong | 718/108 |
| 7,721,285 B2 | 5/2010 | Imada et al. | |
| 2002/0173863 A1 | 11/2002 | Imada et al. | |
| 2007/0143754 A1 | 6/2007 | Imada et al. | |
| 2010/0186012 A1 | 7/2010 | Imada et al. | |
| 2012/0036251 A1 * | 2/2012 | Beaty et al. | 709/224 |

OTHER PUBLICATIONS

International Search Report issued Jan. 31, 2012 in International (PCT) Application No. PCT/JP2011/005855.

Yutaka Haga, "Windows Server 2008 R2 Hyper-V Server Virtualization", Kasoka Gijutsu, Fujitsu, vol. 62, No. 1, Jan. 11, 2011, pp. 86-92 along with English abstract.

* cited by examiner

SCREEN LAYER MANAGEMENT INFORMATION : 1441

| DISPLAY ORDER 1451 | COORDINATE 1452 (x, y) | SIZE 1453 (width, height) | MEMORY BUFFER POINTER 1454 | DUMMY LAYER INFORMATION 1455 |
|---|---|---|---|---|
| 1 | (10,100) | (120,130) | 0 × 41000000 | × |
| 2 | (30,80) | (100,90) | 0 × 42000000 | O |
| 3 | (50,60) | (110,140) | 0 × 43000000 | × |

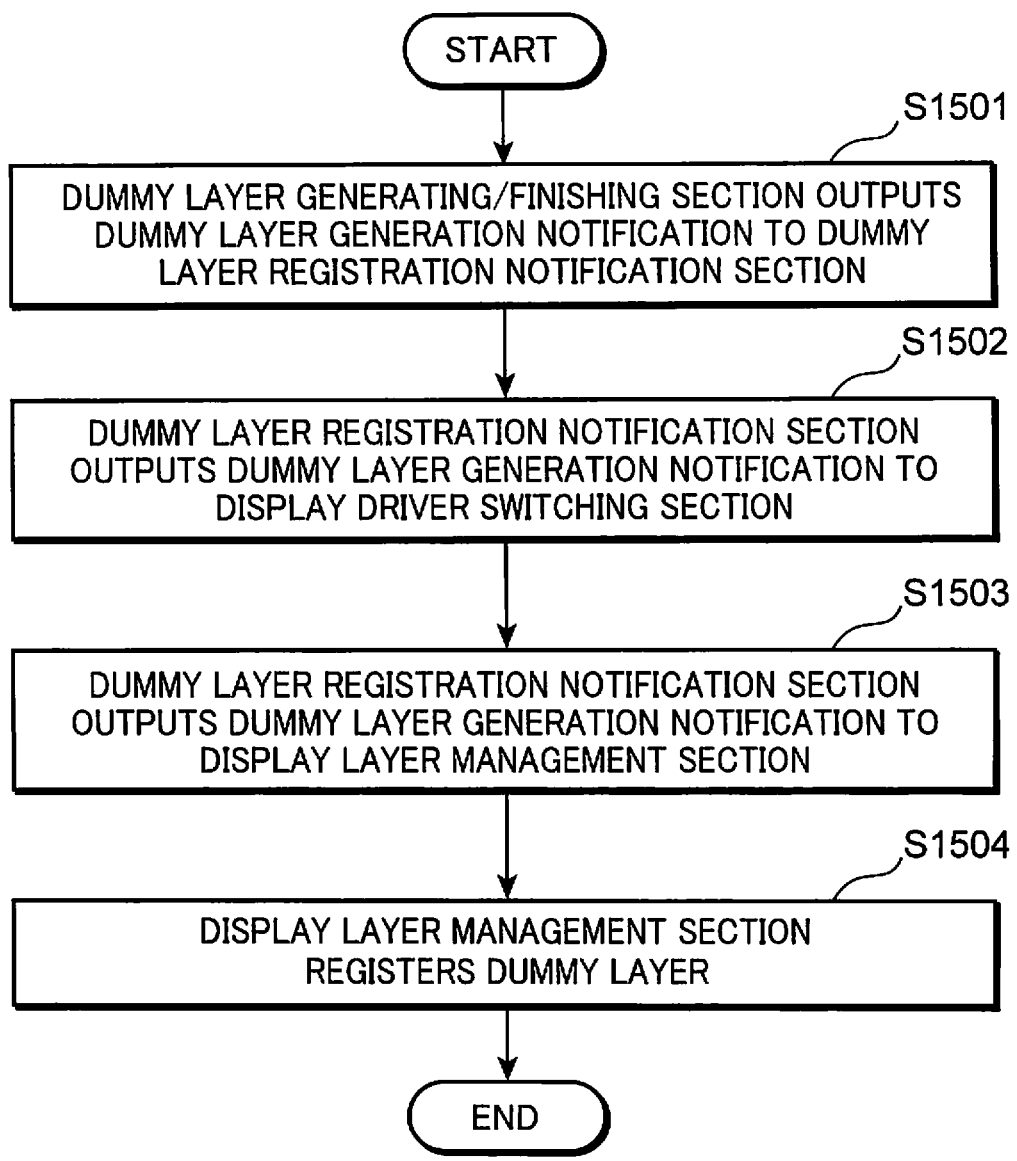

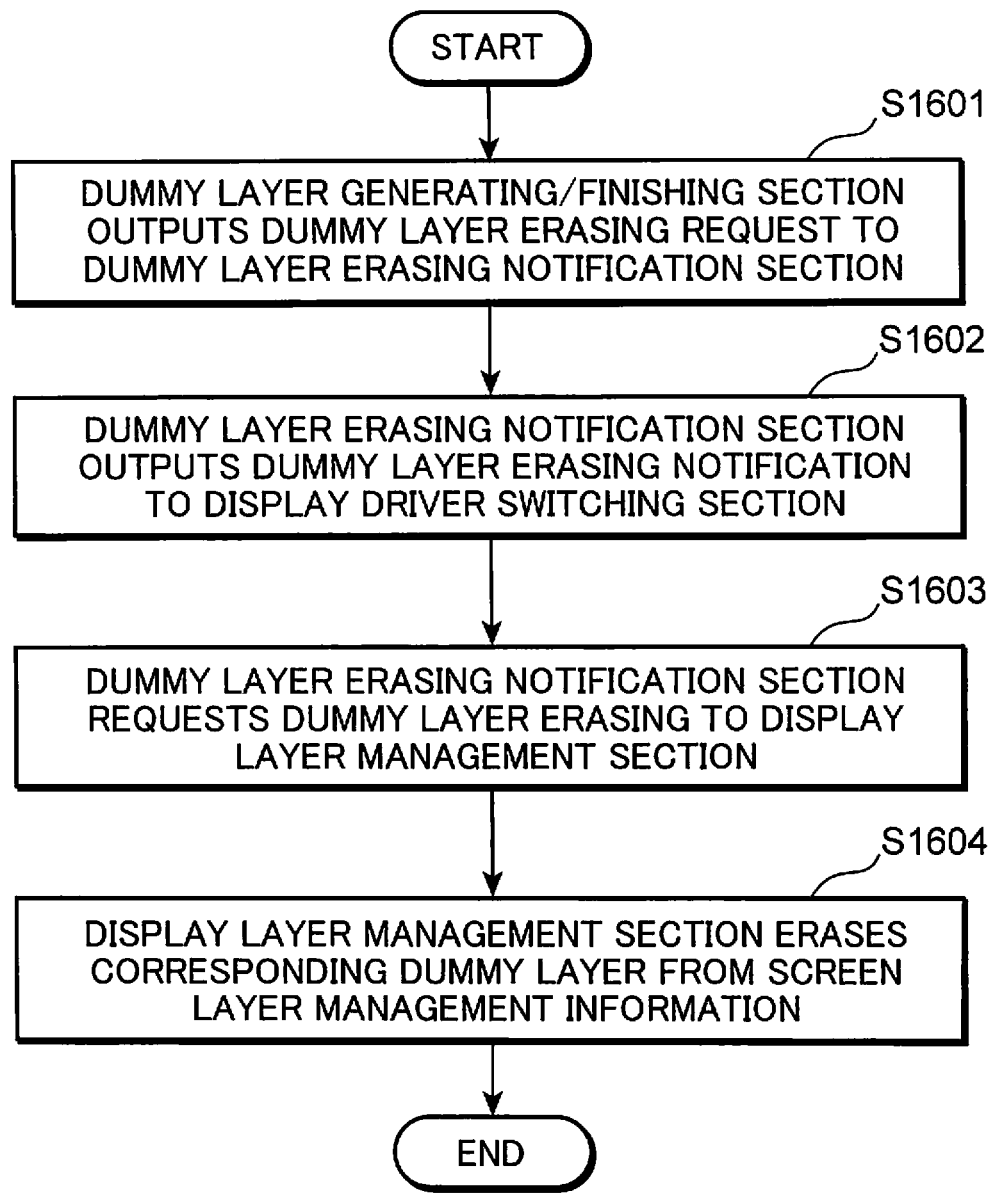

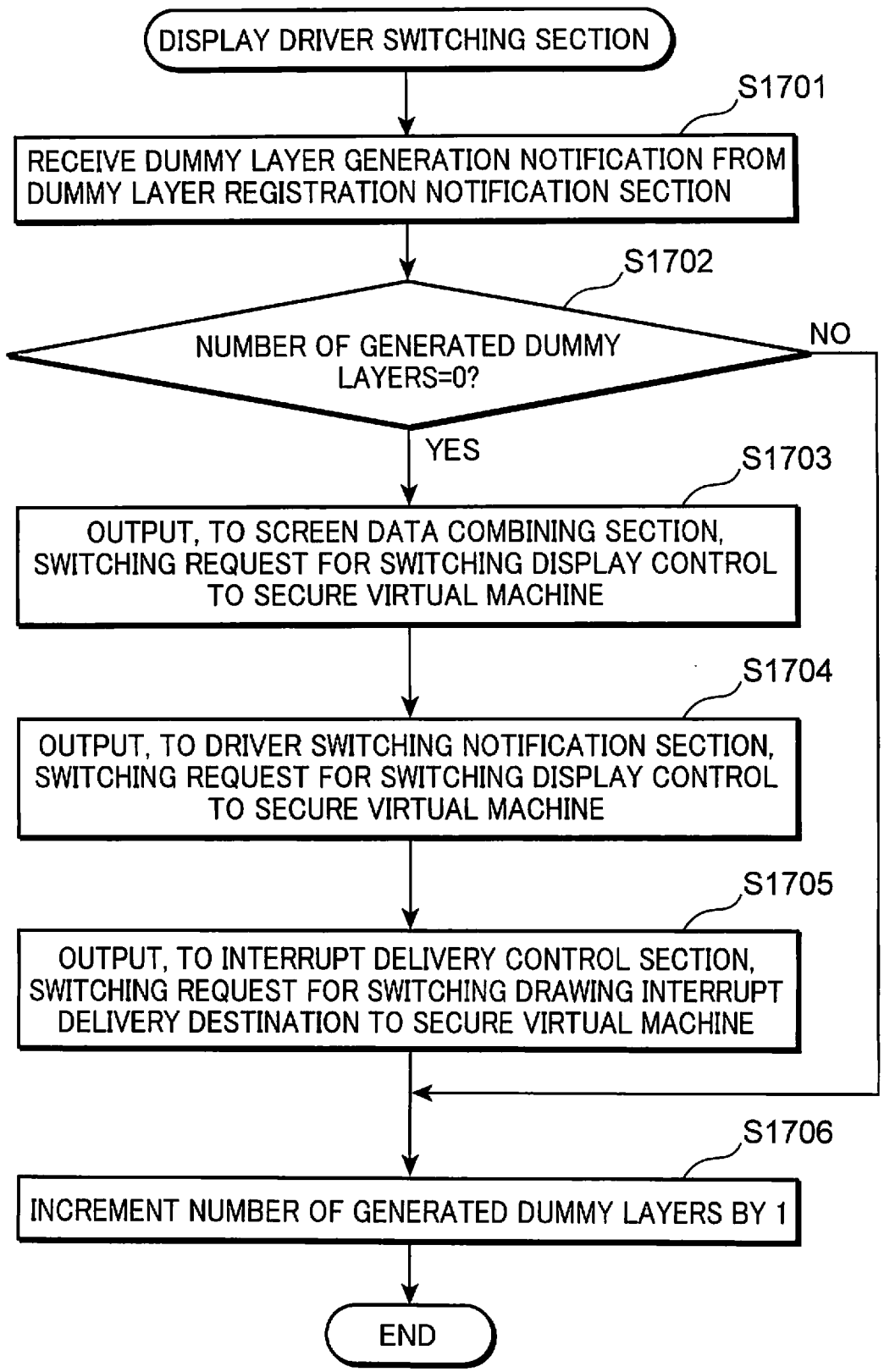

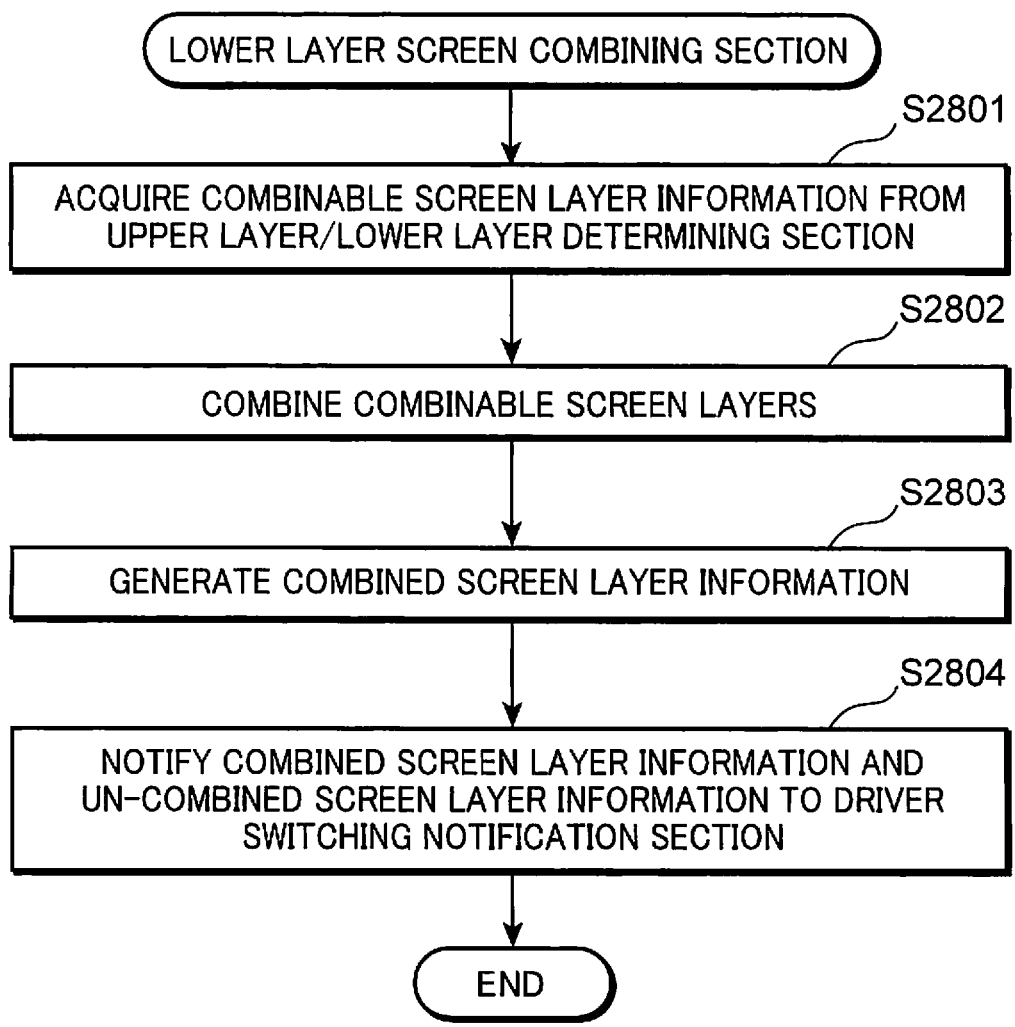

FIG.21
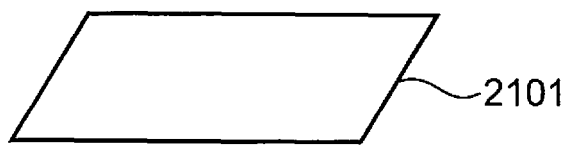

VIRTUAL MACHINE DISPLAY DEVICE, VIRTUAL MACHINE DISPLAY METHOD, RECORDING MEDIUM, AND INTEGRATED CIRCUIT

TECHNICAL FIELD

The present invention relates to a technology of operating a plurality of virtual machines, and more particularly to a technology of combining images to be outputted from a plurality of virtual machines.

BACKGROUND ART

Conventionally, there has been known, as a technology relating to display processing of a virtual machine, a technology wherein a virtual machine control program recognizes screen switching from an input device for exclusively displaying a screen image corresponding to each respective virtual machine on a common display device in accordance with a designation (see e.g. patent literature 1).

More specifically, a virtual machine control program called a hypervisor retains screen data representing a screen image to be outputted from each respective virtual machine in a screen buffer. Then, in response to receiving a request from an input device to switch from a screen image of a certain virtual machine to a screen image of another virtual machine, the virtual machine control program exclusively switches the on-screen image of the certain virtual machine to the screen image of the designated virtual machine.

In the technology disclosed in patent literature 1, however, it is impossible to combine screen images of the virtual machines, because the virtual machine control program exclusively switches the screen image of each respective virtual machine.

Further, there is also disclosed, as another technology relating to display processing of a virtual machine, a technology of dynamically controlling superimposition of images between different drawing systems, window by window, on a display such as an LCD (Liquid Crystal Display) (see e.g. patent literature 2).

Specifically, in the technology disclosed in patent literature 2, a system is provided with a processing section (1) and a processing section (2) in each of which a different OS is installed, a window (711) is drawn in a hardware layer (HW layer) (71) as a VRAM prepared in the processing section (1), and a window (712) is drawn in an HW layer as a VRAM prepared in the processing section (2). In the case where the priority of the HW layer (71) is lower than the priority of the HW layer (72), the window (711) drawn in the HW layer (71) is detected as a specific window, and a transparent window (725) having the same position and the same size as those of the specific window is drawn in the HW layer (72). Then, the HW layer (71) and the HW layer (72) are combined by an LCD controller, and a combined image in which the window (711) and the window (712) are superimposed one over the other is displayed on a display screen (41). Thereby, the window (71) drawn in the HW layer (71) is displayed in front of the window (712) drawn in the HW layer (72) through the transparent window (725) drawn in the HW layer (72).

In the technology disclosed in patent literature 2, the LCD controller is operable to combine the HW layer (71) in which the window (711) is drawn, and the HW layer (72) in which the transparent window (712) and the window (712) are drawn. It is, however, uncertain whether the above technology is feasible, because there is no specific description about a manner as to how the LCD controller combines the layers.

Further, the technology disclosed in patent literature 2 has a problem that the window (711) drawn in the HW layer (71) is displayed in front of the window (712) drawn in the HW layer (72), regardless of the fact that the priority of the HW layer (72) is higher than the priority of the HW layer (71).

In this section, in patent literature 2, let us consider a case that the transparent window (725) is a window having a specific key color (e.g. black), and the LCD controller combines the HW layer (71) and the HW layer (722) by drawing the window (711) that has been drawn in the HW layer (71) in a region where the key color is painted in the HW layer (72). In this case, if another window which is semi-transparent is superimposed on the HW layer (72), the color of the transparent window (725) changes from the key color to another color. As a result, it is impossible to draw the window (711) that has been drawn in the HW layer (71) in the transparent window (725).

There is a case that secure virtual machines and non-secure virtual machines are provided in a virtual machine system configured of a plurality of virtual machines. In such a case, it is required to inhibit a non-secure virtual machine from accessing screen data to be drawn by a secure virtual machine.

However, patent literatures 1 and 2 are silent about an arrangement taking into account co-existence of non-secure virtual machines and secure virtual machines. Thus, there is a problem that a non-secure virtual machine may access screen data representing a screen layer to be drawn by a secure virtual machine.

If a virtual machine system provided with secure virtual machines and non-secure virtual machines is configured in such a manner that a secure virtual computer combines screen layers generated in both of the secure virtual machine and a non-secure virtual machine, it is possible to protect the screen layer generated in the secure virtual machine from the non-secure virtual machine.

There is also another problem that frequent generation or erasing of a screen layer in a non-secure virtual machine results in frequent data transmission/receiving between a secure virtual machine and the non-secure virtual machine, which may degrade the performance of the entirety of the system.

CITATION LIST

Patent Literature

Patent literature 1: Japanese Unexamined Patent Publication No. 2002-318699
Patent literature 2: Japanese Unexamined Patent Publication No. 2009-157635

SUMMARY OF INVENTION

An object of the invention is to provide a technology of combining screen layers generated in different virtual machines in the display order, while preventing one of the virtual machines from accessing a screen layer in the other of the virtual machines for reducing a processing of switching between the different virtual machines.

A virtual machine display device according to an aspect of the invention is a virtual machine display device including a first virtual machine, a second virtual machine, a virtual machine controller which controls the first and second virtual machines, a first memory which holds screen data representing a screen layer of the first virtual machine, and a second memory which holds screen data representing a screen layer of the second virtual machine, the virtual machine display device adapted to combine screen layers of the first and second virtual machines for displaying a combined screen on a display device. The first virtual machine includes a dummy layer generating section which, in the case where a screen layer of the second virtual machine is generated, generates a dummy layer for managing the generated screen layer by the first virtual machine; a display layer management section which manages screen layer management information including at least a display order of screen layers of the first virtual machine and the dummy layer; a display driver switching section which switches display control to the first virtual machine in the case where the dummy layer is not generated, and switches the display control to the second virtual machine in the case where at least the one dummy layer is generated; and a first screen data combining section which combines screen layers of the first virtual machine, using the screen data held in the first memory, based on the screen layer management information in the case where the display driver switching section switches the display control to the first virtual machine. The virtual machine controller includes a driver switching notification section which designates the second virtual machine to combine screen layers in the case where the display driver switching section switches the display control to the second virtual machine. The second virtual machine includes a second screen data combining section which combines the screen layers of the first and second virtual machines, using the screen data held in the first and second memories, based on the screen layer management information, in the case where the driver switching notification section designates the second virtual machine to combine the screen layers.

Further, a virtual machine display method, a virtual machine display program, a recording medium, and an integrated circuit according to another aspect of the invention have the features of the aforementioned virtual machine display device.

BRIEF DESCRIPTION OF DRAWINGS

FIG. 6 is a flowchart showing a processing to be performed in the case where a dummy layer is registered into the screen layer management information;

FIG. 7 is a flowchart showing a processing to be performed in the case where a registered dummy layer is erased from the screen layer management information;

FIG. 8 is a flowchart showing a processing to be performed in the case where a display driver switching section receives a dummy layer generation notification from a dummy layer registration notification section;

FIG. 19 is a flowchart showing a processing to be performed in the case where a lower layer screen combining section pre-combines combinable screen layers by a non-secure virtual machine;

FIGS. 20A and 20B are explanatory diagrams of a union region, wherein FIG. 20A is a bird's eye view, and FIG. 20B is a top plan view; and FIG. 21 is a diagram showing screen layers to be pre-combined by the lower layer screen combining section.

DESCRIPTION OF EMBODIMENTS

Figure 1:
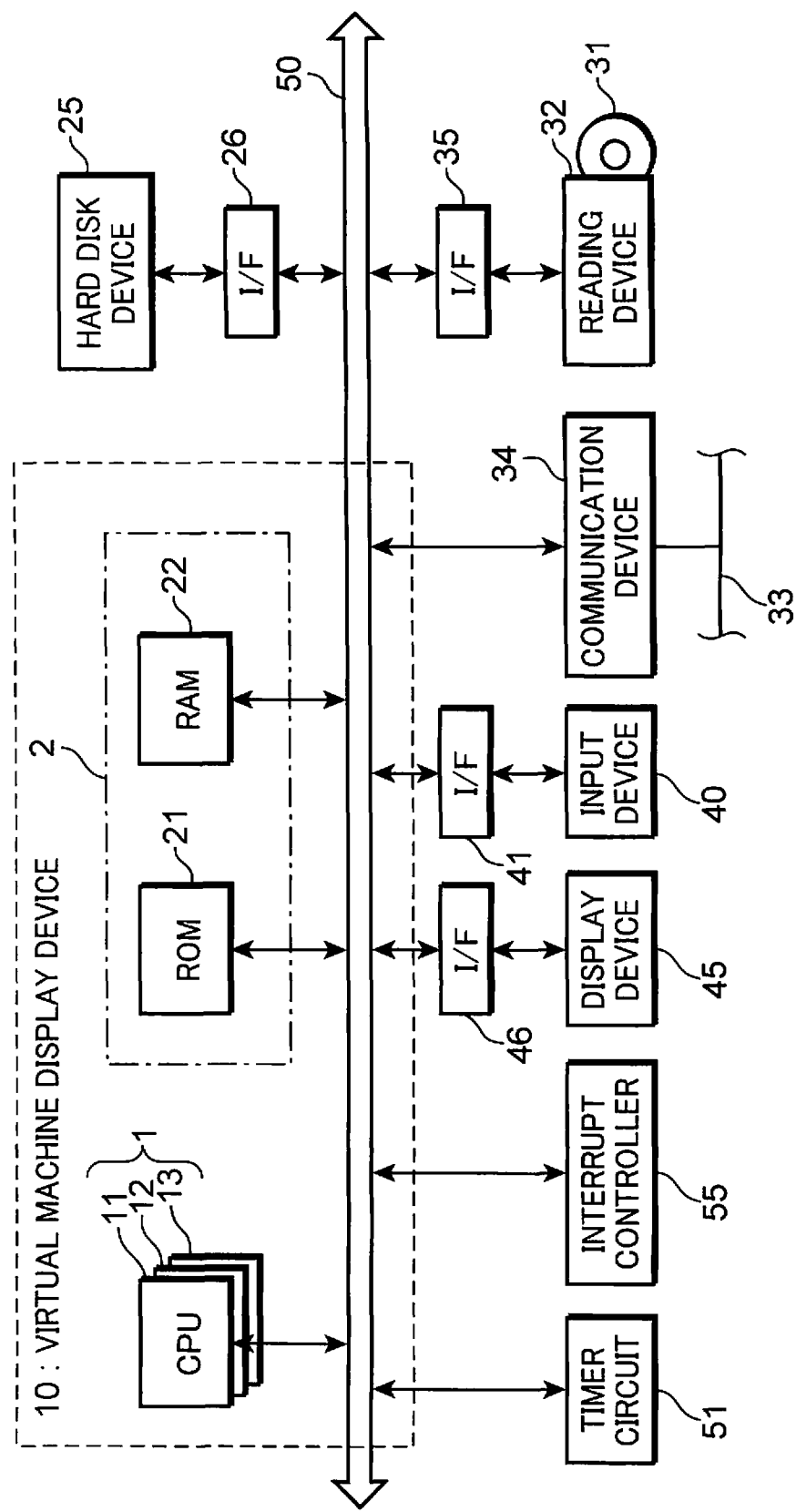
FIG. 1 is a block diagram of an information processing device provided with a virtual machine display device embodying the invention.

In the following, embodiments of the invention will be described referring to the drawings.

First Embodiment

FIG. 1 is a block diagram showing an information processing device provided with a virtual machine display device embodying the invention. The information processing device 1000 itself may be used by a user, but may be incorporated in various devices. A representative example of the information processing device 1000 is a versatile computer such as a PC (Personal Computer), but may be a mobile communication terminal such as a PDA (Personal Digital Assistance) or a mobile phone. Alternatively, the information processing device 1000 may be applied to a television, a hard disk recorder, various disc recorders or various disc players for DVDs or Blu-ray discs, or a car navigation system.

The information processing device 1000 is provided with a processor 1, a memory device 2, a communication device 34, an input device 40, a display device 45, a timer circuit 51, and an interrupt controller 55. A representative example of the processor 1 is an arithmetic processing unit such as a CPU (Central Processing Unit), a processor for media processing or graphic processing, or a DSP (Digital Signal Processor). Each of the blocks shown in FIG. 1 is mutually connected to each other via a bus line 50. Further, it is possible to connect a hard disk device 25 and a reading device 32 to the bus line 50, as necessary. The hard disk device 25, the reading device 32, the input device 40, and the display device 45 are respectively connected to the bus line 50 via interfaces 26, 35, 41, 46.

The processor 1 may be constituted of a single processor, or may be constituted of processors. As an example, the information processing device 1000 has processors 11, 12, 13, . . . . The memory device 2 is provided with an ROM (Read Only Memory) 21 and an RAM (Random Access memory) 22.

The ROM 21 stores therein a computer program for defining an operation of the processor 1 as well as data. The computer program and the data may be stored in the hard disk device 25. The processor 1 executes a processing defined by the computer program, while writing, into the RAM 22, the computer program and the data stored in the ROM 21 or the hard disk device 25, as necessary. The RAM 22 also functions as a medium for temporarily storing data that is generated during execution of a processing by the processor 1. The ROM 21 may include a non-volatile memory or storage medium capable of writing and retaining storage contents even in a power-off state, such as a flash ROM. The RAM 22 may include a volatile memory or storage medium incapable of retaining storage contents in a power-off state.

The hard disk device 25 is a device for writing and reading out a computer program or data to and from an unillustrated built-in hard disk. The reading device 32 is a device for reading out a computer program or data recorded in a recording medium 31 (e.g. a CD, a DVD or a memory card). The communication device 34 is a device for exchanging a computer program or data between an external device and the communication device 34 through a phone line, a network line, wirelessly, or a communication line 33 such as infrared communication. The input device 40 is a device for inputting data and the like by user's manipulation. Examples of the input device 40 are a keyboard arranged on a PDA, input buttons arranged on a mobile phone, and a detachably attachable mouse or keyboard. The display device 45 is a device for displaying e.g. data or an image on a screen, and outputting e.g. data by sounds. Examples of the display device 45 are an LCD (Liquid Crystal Display), a CRT, and a speaker.

The timer circuit 51 is a device for outputting a timer interrupt signal at a predetermined cycle. The interrupt controller 55 is a device for relaying, to the processor 1, an interrupt request signal to be transmitted from e.g. the timer circuit 51, the input device 40, the processor 1, the communication device 34 as a network device, the hard disk device 25, or the reading device 32. The interrupt request from each respective device has a priority. The interrupt controller 55 has a function of arranging these requests depending on the priorities, in the case where an interrupt has occurred simultaneously in plural devices.

As described above, the information processing device 1000 is constituted as a computer. The computer program may be supplied through the ROM 21, the hard disk device 25, an unillustrated flexible disc, or the recording medium 31 such as a CD-ROM; or may be supplied through a transmission medium such as the communication line 33. For instance, a computer program recorded in the recording medium 31 (CD-ROM) can be read out by connecting the reading device 32 to the information processing device 1000. Further, the information processing device 1000 can store the read out computer program into the RAM 22 or into the hard disk device 25.

In the case where a computer program is supplied from the ROM 21 as a program recording medium, the processor 1 is operable to execute a processing in accordance with the computer program by loading the ROM 21 in the information processing device 1000. The computer program to be supplied through a transmission medium such as the communication line 33 is received through the communication device 34, and is stored in e.g. the RAM 22 or the hard disk device 25. The transmission medium is not limited to a wired transmission medium, but may be a wireless transmission medium. Further, the transmission medium not only includes a communication line path but also includes a relay device for relaying a communication line path e.g. a router.

A virtual machine display device 10 is implemented by executing a virtual machine display program stored in the memory device 2 or in the hard disk device 25, by the memory device or the hard disk device 25, and the processor 1 in cooperation with each other.

Figure 2:
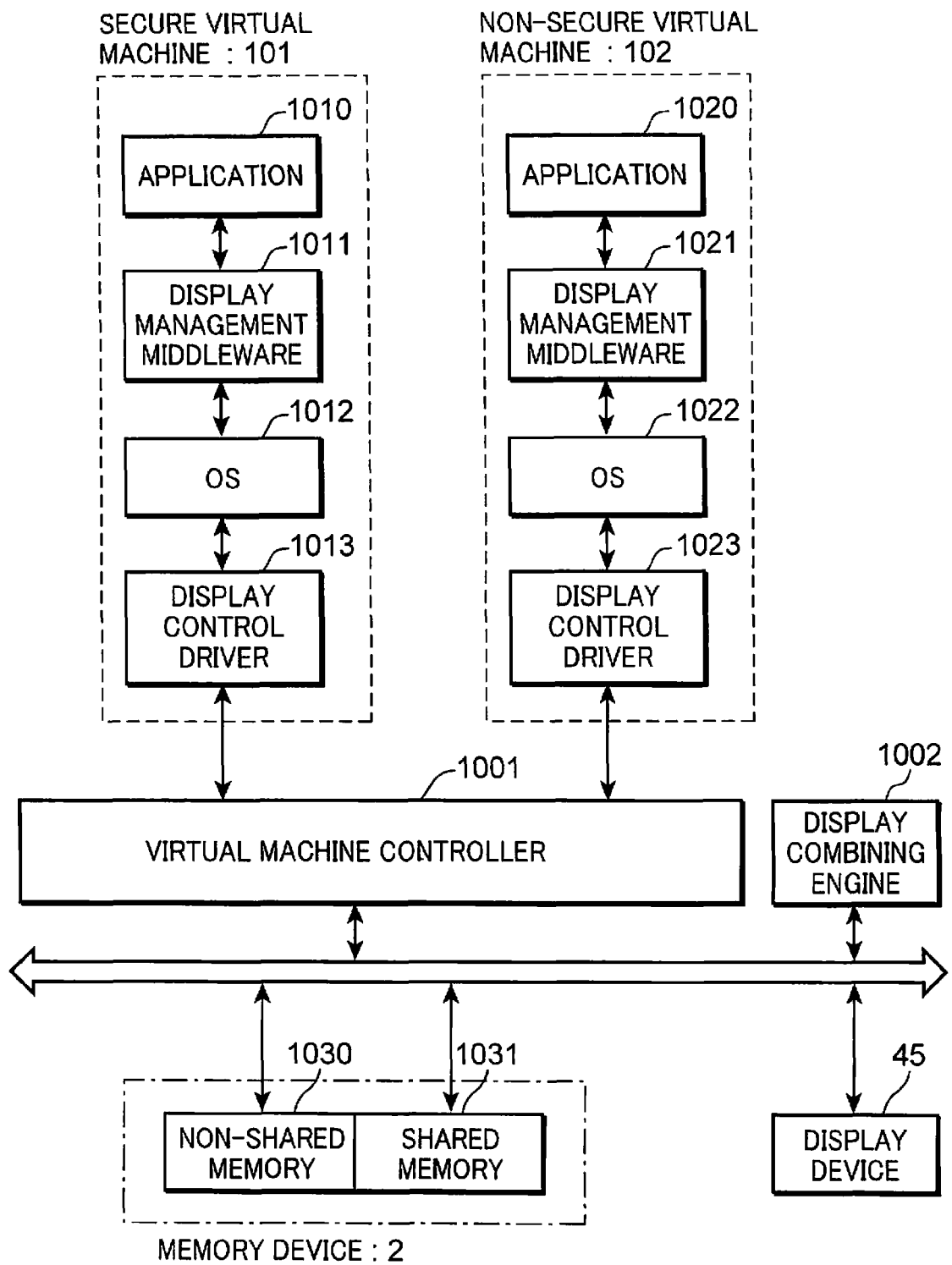
FIG. 2 is a schematic diagram showing an example of a configuration of the virtual machine display device in a first embodiment of the invention.

FIG. 2 is a schematic diagram showing an example of a configuration of the virtual machine display device 10 in the first embodiment of the invention. This embodiment is described based on the premise that virtual machines to be controlled by a virtual machine controller 1001 include a secure virtual machine 101 (an example of a second virtual machine) and a non-secure virtual machine 102 (an example of a first virtual machine).

The secure virtual machine 101 is provided with one or more applications 1010, which is a user program, and which is adapted to draw an image on a screen. The memory device 2 is provided with a shared memory 1031 which is shared and usable by the secure virtual machine 101 and by the non-secure virtual machine 102, and a non-shared memory 1030 usable only by the secure virtual machine 101. The shared memory 1031 and the non-shared memory 1030 may not necessarily be physically separated as memory chips or memory devices. The shared memory 1031 and the non-shared memory 1030 may be discriminated from each other by managing to which virtual machine, the virtual machine controller 1001 gives an access right to a specific memory region of a single memory device.

The application 1010 acquires a screen buffer for a screen layer through a display management middleware 1011 for creating data representing a screen layer to be drawn on a screen. Then, the application 1010 computes screen data which the user wishes to draw, and draws the screen data in the acquired screen buffer.

In response to receiving a screen buffer acquisition request from the application 1010, the display management middleware 1011 acquires a screen buffer from the non-shared memory 1030 in the memory device 2, and transfers the address of the screen buffer to the application 1010. Specifically, the display management middleware 1011 acquires a screen buffer from a memory region inaccessible by the non-secure virtual machine 102, for a screen layer of the secure virtual machine 101.

Further, the display management middleware 1011 manages information relating to the size of a screen layer of one or more applications 1010, information relating to the positional arrangement on a screen, information relating to the display order of the screen layers. Then, the display management middleware 1011 notifies a display control driver 1013 of the screen layer information to be managed through an OS 1012, which is an operating system.

In the same manner as in the secure virtual machine 101, a display management middleware 1021 of the non-secure virtual machine 102 manages information relating to a screen layer to be drawn by individual applications 1020, and notifies a display control driver 1023 of the screen layer information. In this case, however, a screen buffer for a screen layer to be acquired by the display management middleware 1021 is acquired from the shared memory 1031 in the memory device 2. Specifically, a screen buffer for a screen layer of the non-secure virtual machine 102 is acquired from a memory region accessible by the secure virtual machine 101.

The display control driver 1013 and the display control driver 1023 cooperatively use a display combining engine 1002 through the virtual machine controller 1001, or combine a screen layer of the secure virtual machine 101 and a screen layer of the non-secure virtual machine 102 by a processing in a software. Then, the display control driver 1013 and the display control driver 1023 control the display device 45 to display screen data to be finally outputted.

The virtual machine controller 1001 controls the secure virtual machine 101 and the non-secure virtual machine 102, and performs scheduling regarding to which virtual machine, the execution right of the processor 1 is to be transferred for execution. Further, in response to receiving an interrupt request from an actual device, the virtual machine controller 1001 analyzes the factor of the interrupt, and decides to which virtual machine, the interrupt is to be delivered.

The virtual machine controller 1001 is generally called a virtual machine monitor (VMM) or a hypervisor.

Figure 3:
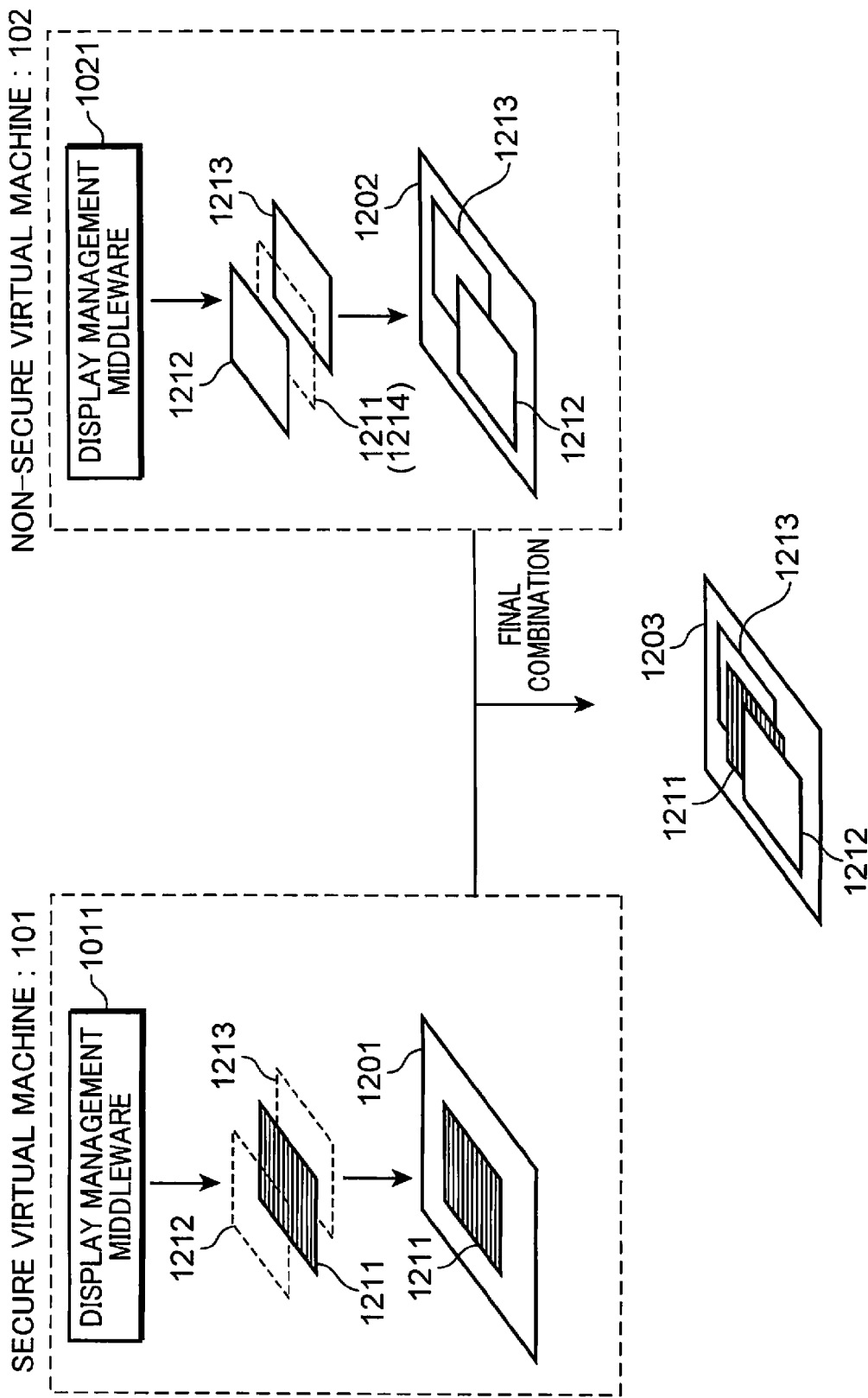
FIG. 3 is a schematic diagram showing a processing of combining screen data of a secure virtual machine and screen data of a non-secure virtual machine.

Next, referring to FIG. 3, there is described a processing of combining a screen layer of the secure virtual machine 101 and screen layers of the non-secure virtual machine 102. FIG. 3 is a schematic diagram showing a processing of combining a screen layer of the secure virtual machine 101 and screen layers of the non-secure virtual machine 102.

The secure virtual machine 101 secures a screen buffer 1201 in the non-shared memory 1030 through the display management middleware 1011. Then, the secure virtual machine 101 draws, into the secured screen buffer 1201, a screen layer 1211 whose display is requested by the application 1010.

On the other hand, the non-secure virtual machine 102 secures a screen buffer 1202 in the shared memory 1031 through the display management middleware 1021. Then, the non-secure virtual machine 102 draws, into the secured screen buffer 1202, a screen layer 1212 and a screen layer 1213 whose display is requested by the application 1020.

The screen layer 1211 of the secure virtual machine 101, and the screen layers 1212, 1213 of the non-secure virtual machine 102 are finally combined in a screen buffer 1203 for displaying on the display device 45 as a single display device. In this case, the display order regarding which screen layer is to be located on a front surface (upper layer) or on a rear surface (lower layer) is defined for the screen layer 1211 of the secure virtual machine 101 and for the screen layers 1212, 1213 of the non-secure virtual machine 102.

For instance, in FIG. 3, the screen layer 1213 of the non-secure virtual machine 102 corresponds to a lowermost layer, and the screen layer 1212 of the non-secure virtual machine 102 corresponds to an uppermost layer. Further, the screen layer 1211 of the secure virtual machine 101 is interposed between the screen layer 1212 and the screen layer 1213.

Accordingly, in the screen buffer 1203, the screen layers 1213, 1211, 1212 are finally placed one over the other in this order from the lowermost position.

In this example, there is described a case that the secure virtual machine 101 and the non-secure virtual machine 102 individually and respectively combine screen layers to be managed. In this case, the secure virtual machine 101 draws, into the screen buffer 1201, the screen layer 1211 to be managed by the display management middleware 1011.

Further, the non-secure virtual machine 102 draws, into the screen buffer 1202, the screen layers 1212, 1213 to be managed by the display management middleware 1021. In this way, conventionally, a drawing operation of a screen layer of each respective virtual machine is individually implemented by each respective display control driver.

Then, the display combining engine 1002 secures the screen buffer 1203 for use in combination; and combines the screen layers 1211 through 1213 by drawing, into the secured screen buffer 1203, the screen layer 1211 that has been drawn in the screen buffer 1201, and the screen layers 1212, 1213 that have been drawn in the screen buffer 1202.

As described above, in the conventional configuration, the secure virtual machine 101 and the non-secure virtual machine 102 do not share information relating to the display order, but individually draw the screen layers. As a result, the secure virtual machine 101 was unable to know that there is the screen layer 1212 of the non-secure virtual machine 102 over the screen layer 1211, and there is the screen layer 1213 of the non-secure virtual machine 102 under the screen layer 1211. Further, the non-secure virtual machine 102 was unable to know that there is the screen layer 1211 of the secure virtual machine 101 between the screen layer 1212 and the screen layer 1213.

Further, the display combining engine 1002 was also unable to know the display order of the screen layers to be finally combined. Accordingly, the display combining engine 1002 could not accurately combine the screen layers 1211 through 1213. In view of the above, in the conventional configuration, for instance, the display order was set for each of the virtual machines, and the screen layers were combined in the set display order. For instance, in the case where the display order regarding the secure virtual machine 101 was set higher than the display order regarding the non-secure virtual machine 102, the screen layer 1211 was drawn over the screen layers 1212, 1213, and the screen layer 1211 could not be drawn between the screen layer 1212 and the screen layer 1213.

In view of the above, this embodiment is configured in such a manner that the non-secure virtual machine 102 generates a dummy layer 1214 for managing the screen layer 1211 on the non-secure virtual machine 102 side in response to detecting generation of the screen layer 1211 in the secure virtual machine 101, and registers the dummy layer 1214 into screen layer management information for managing e.g. the display order, the display position, and the display size of the dummy layer 1214.

Then, the secure virtual machine 101 replaces the dummy layer 1214 with the screen layer 1211, and combines the screen layers 1211 through 1213 in the display order described in the screen layer management information. Thereby, the screen layer 1211 can be positioned between the screen layer 1212 and the screen layer 1213.

Further, this embodiment is based on the premise that a screen layer frequently appears and disappears in the non-secure virtual machine 102. Specifically, the embodiment is described, taking into consideration of a condition that the application 1010 of the secure virtual machine 101 is not activated, and that a screen layer is frequently generated resulting from the application 1020 of the non-secure virtual machine 102.

In such a condition, if the information processing device is configured to combine all the screen layers only by the secure virtual machine 101, the non-secure virtual machine 102 is required to notify the secure virtual machine 101 of appearance and disappearance of a screen layer through the virtual machine controller 1001, each time a screen layer appears and disappears in the non-secure virtual machine 102.

In other words, if the information processing device is configured to combine all the screen layers only by the secure virtual machine 101, information transmission/receiving is performed between the virtual machines, regardless of the fact that only the application 1020 of the non-secure virtual machine 102 is activated. This may degrade the drawing performance.

In view of the above, in this embodiment, in the case where the number of screen layers of the secure virtual machine 101 is zero, display control is performed on the side of the non-secure virtual machine 102 for combining the screen layers. On the other hand, in the case where at least one screen layer of the secure virtual machine 101 is generated, display control is switched to the secure virtual machine 101.

By performing the above operation, even if only the application 1020 of the non-secure virtual machine 102 is activated, and a screen layer of the non-secure virtual machine 102 frequently appears and disappears, combination of the screen layers is performed only by the non-secure virtual machine 102. This eliminates the need of notifying appearance and disappearance of a screen layer from the non-secure virtual machine 102 to the secure virtual machine 101 through the virtual machine controller 1001, and prevents degradation of the drawing performance.

Further, in this embodiment, the non-secure virtual machine 102 performs display control only in the case where a dummy layer is not generated. In the case where at least one dummy layer is generated, the display control is switched to the secure virtual machine 101.

The above configuration allows the non-secure virtual machine 102 to read out the screen data representing a screen layer by accessing only to the shared memory 1031 for combining the screen layers, and prevents the non-secure virtual machine 102 from accessing the non-shared memory 1030.

As an example in which a screen layer frequently appears and disappears in the non-secure virtual machine 102, there is presumed e.g. a case that, in a mobile terminal such as a smart phone, the non-secure virtual machine 102 is constituted of an open platform OS or middleware such as Android™, and the secure virtual machine is constituted of a non-open platform OS or middleware.

Figure 4:
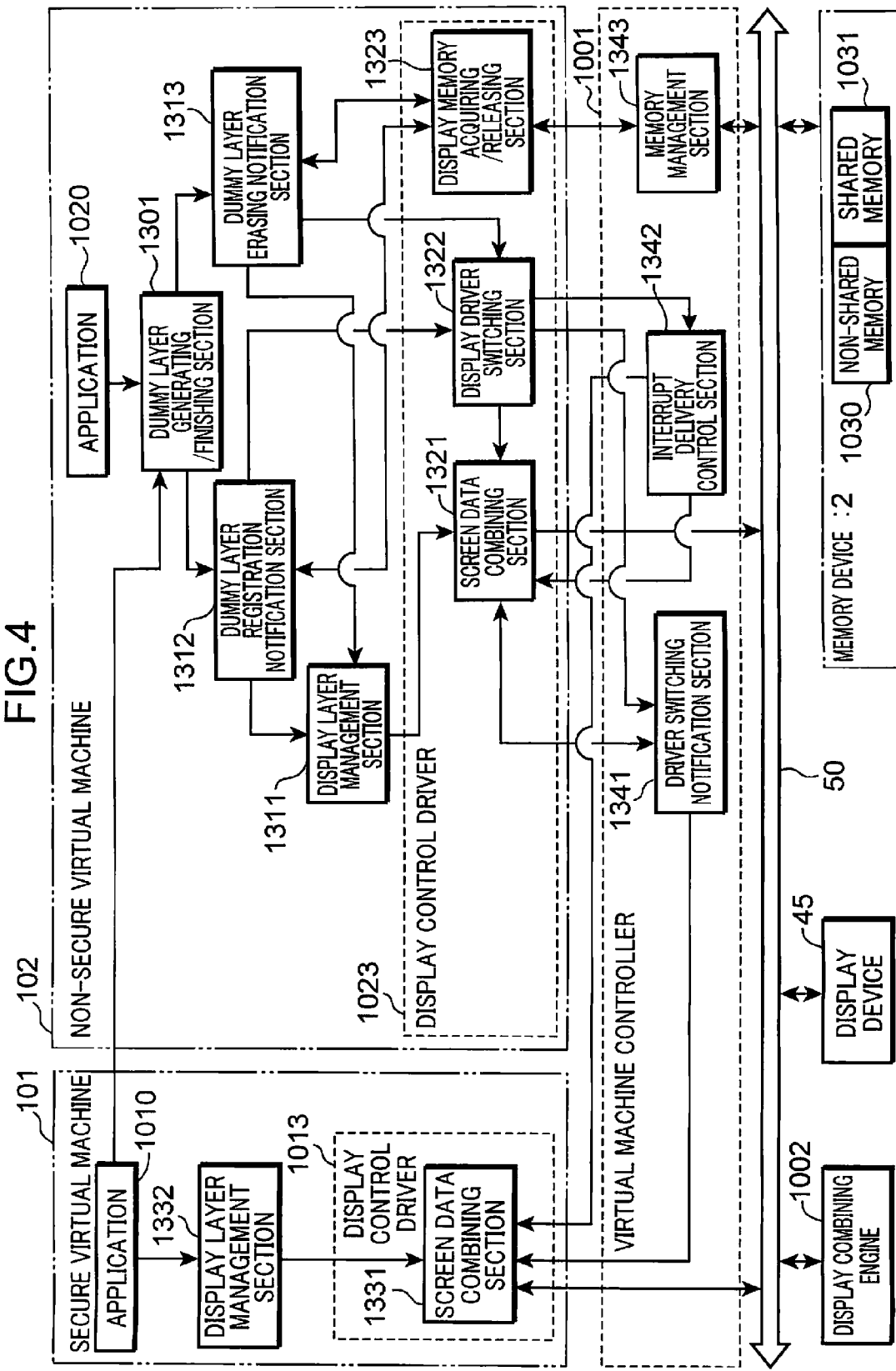
FIG. 4 is a block diagram showing a detailed configuration of the virtual machine display device in the first embodiment of the invention.

FIG. 4 is a block diagram showing a detailed configuration of the virtual machine display device 10 in the first embodiment of the invention. Referring to FIG. 4, a dummy layer generating/finishing section 1301, a dummy layer registration notification section 1312, a display layer management section 1311, and a dummy layer erasing notification section 1313 are constituted by e.g. the display management middleware 1021 and an OS 1022. Further, a display layer management section 1332 is constituted by e.g. the display management middleware 1011 and the OS 1012.

In the case where a screen layer of the secure virtual machine 101 is generated, the dummy layer generating/finishing section 1301 (an example of a dummy layer generating section) generates a dummy layer for managing the generated screen layer by the non-secure virtual machine 102.

In this example, the dummy layer generating/finishing section 1301 monitors the presence or absence of generation and finishing of a screen layer in the secure virtual machine 102 and in the non-secure virtual machine 102. Specifically, in the case where the dummy layer generating/finishing section 1301 receives a dummy layer generation notification from the application 1010, the dummy layer generating/finishing section 1301 determines that a screen layer of the secure virtual machine 101 has been generated, generates data including screen information necessary for drawing the generated screen layer, as a dummy layer, and outputs a dummy layer generation notification to the dummy layer registration notification section 1312.

Further, in response to receiving the screen layer generation notification from the application 1020, the dummy layer generating/finishing section 1301 determines that a screen layer of the non-secure virtual machine 102 has been generated, and outputs a screen layer generation notification to the dummy layer registration notification section 1312.

Further, in the case where the dummy layer generating/finishing section 1301 receives a screen layer finishing notification from the application 1010, the dummy layer generating/finishing section 1301 determines that the target screen layer of the secure virtual machine 101 has been finished, and outputs, to the dummy layer erasing notification section 1313, a request for erasing the dummy layer corresponding to the target screen layer.

Further, in the case where the dummy layer generating/finishing section 1301 receives a screen layer finishing notification from the application 1020, the dummy layer generating/finishing section 1301 determines that the target screen layer of the non-secure virtual machine 102 has been finished, and outputs, to the dummy layer erasing notification section 1313, a request for erasing the target screen layer.

In response to receiving a dummy layer generation notification from the dummy layer generating/finishing section 1301, the dummy layer registration notification section 1312 requests the display layer management section 1311 to register the dummy layer into screen layer management information 1441 (see FIG. 5) for registering the dummy layer into the screen layer management information 1441. Further, the dummy layer registration notification section 1312 outputs, to a display memory acquiring/releasing section 1323, a screen buffer acquisition request for drawing screen data representing a screen layer corresponding to the dummy layer.

Then, in response to receiving a notification of the address of the screen buffer acquired by the display memory acquiring/releasing section 1323, the dummy layer registration notification section 1312 requests the display layer management section 1311 to register the address into the screen layer management information 1441. In this case, the screen buffer is secured in the non-shared memory 1030.

The address of the screen buffer acquired by the display memory acquiring/releasing section 1323 is also notified to the display layer management section 1332 in the secure virtual machine 101 by a memory management section 1343. Thereby, the secure virtual machine 101 recognizes the screen buffer for drawing a screen layer corresponding to a dummy layer, and draws, into the screen buffer, screen data representing the screen layer corresponding to the dummy layer. Thereby, each time a screen layer is generated on the secure virtual machine side, the generated screen layer is drawn in the non-shared memory 1030 by the secure virtual machine 101.

Further, in response to registration of a dummy layer into the screen layer management information 1441, the dummy layer registration notification section 1312 outputs a dummy layer generation notification to a display driver switching section 1322.

Further, in response to receiving a screen layer generation notification that has been outputted from the dummy layer generating/finishing section 1301, the dummy layer registration notification section 1312 requests the display layer management section 1311 to register the generated screen layer into the screen layer management information 1441, and causes the generated screen layer to be registered into the screen layer management information 1441. Further, the dummy layer registration notification section 1312 causes the display memory acquiring/releasing section 1323 to acquire a screen buffer for drawing screen data representing the generated screen layer.

In response to receiving a notification of the address of the screen buffer acquired by the display memory acquiring/releasing section 1323, the dummy layer registration notification section 1312 requests the display layer management section 1311 to register the address into the screen layer management information 1441. In this case, the screen buffer is secured in the shared memory 1031.

Then, the non-secure virtual machine 102 draws the screen data representing the screen layer into the acquired screen buffer. Thereby, each time a screen layer is generated on the non-secure virtual machine side, the generated screen layer is drawn in the shared memory 1031 by the non-secure virtual machine 102. Then, in response to registration of the screen layer into the display layer management section 1311, the dummy layer registration notification section 1312 notifies the display driver switching section 1322 of generation of a screen layer in the non-secure virtual machine 102.

In response to receiving a dummy layer erasing request that has been outputted from the dummy layer generating/finishing section 1301, the dummy layer erasing notification section 1313 requests the display layer management section 1311 to erase the target dummy layer from the screen layer management information 1441, and erases the target dummy layer from the screen layer management information 1441. Then, the dummy layer erasing notification section 1313 outputs, to the display memory acquiring/releasing section 1323, a releasing request for releasing the screen buffer secured for drawing screen data representing the screen layer corresponding to the dummy layer. Then, in response to erasing the dummy layer from the screen layer management information 1441, the dummy layer erasing notification section 1313 outputs a dummy layer erasing notification to the display driver switching section 1322.

Further, in response to receiving a screen layer erasing request that has been outputted from the dummy layer generating/finishing section 1301, the dummy layer erasing notification section 1313 requests the display layer management section 1311 to erase the target screen layer from the screen layer management section 1411, and causes the target screen layer to be erased from the screen layer management information 1441. Then, the dummy layer erasing notification section 1313 outputs, to the display memory acquiring/releasing section 1323, a releasing request for releasing the screen buffer secured for drawing screen data representing the target screen layer. Then, in response to erasing the target screen layer from the screen layer management information 1441, the dummy layer erasing notification section 1313 notifies the display driver switching section 1322 that the target screen layer of the non-secure virtual machine 102 has been erased.

In response to receiving a screen buffer acquisition request from the dummy layer registration notification section 1312, the display memory acquiring/releasing section 1323 acquires a screen buffer from the memory management section 1343, and transfers the address of the acquired screen buffer to the dummy layer registration notification section 1312.

In this example, in response to output of a screen buffer acquisition request for drawing a screen layer corresponding to a dummy layer from the dummy layer registration notification section 1312, the display memory acquiring/releasing section 1323 requests the memory management section 1343 to acquire a screen buffer from the non-shared memory 1030.

On the other hand, in response to output of a screen buffer acquisition request for drawing a screen layer of the non-secure virtual machine 102 from the dummy layer registration notification section 1312, the display memory acquiring/releasing section 1323 requests the memory management section 1343 to acquire a screen buffer from the non-shared memory 1030.

Further, in response to receiving a screen buffer releasing request from the dummy layer erasing notification section 1313, the display memory acquiring/releasing section 1323 requests the memory management section 1343 to release the acquired screen buffer.

In response to receiving a screen buffer acquisition request from the display memory acquiring/releasing section 1323, the memory management section 1343 acquires a screen buffer from the memory device 2, and transfers the address of the acquired screen buffer to the display memory acquiring/releasing section 1323. Further, in response to receiving a screen buffer releasing request from the display memory acquiring/releasing section 1323, the memory management section 1343 returns the acquired screen buffer to the memory device 2. The memory management section 1343 can acquire and release a screen buffer from and to both of the non-shared memory 1030 and the shared memory 1031.

The display layer management section 1311 manages the screen layer management information 1441 shown in FIG. 5. In other words, the display layer management section 1311 manages all the screen layers generated in the non-secure virtual machine 102, and manages a screen layer generated in the secure virtual machine 101, as a dummy layer. Further, in the case where the display manner of a screen layer and a dummy layer is altered by e.g. a change in the display position of a screen layer and a dummy layer to be managed or by enlargement or reduction of the size thereof, the display layer management section 1311 updates the screen layer management information 1441 so that the alteration is reflected.

The alteration of the display manner of a screen layer of the non-secure virtual machine 102 is notified from the application 1020, and the display layer management section 1311 acquires the notification through the dummy layer generating/finishing section 1301 and through the dummy layer registration notification section 1312. Further, the alteration of the display manner of a dummy layer is notified from the application 1010, and the display layer management section 1311 acquires the notification through the dummy layer generating/finishing section 1301 and through the dummy layer registration notification section 1312.

In the case where a dummy layer is not generated, the display driver switching section 1322 switches the display control to the secure virtual machine 101; and in the case where at least one dummy layer is generated, the display driver switching section 1322 switches the display control to the non-secure virtual machine 102.

Specifically, in response to receiving a dummy layer generation notification from the dummy layer registration notification section 1312, the display driver switching section 1322 counts up the number of generated dummy layers by one; and in response to receiving a dummy layer erasing notification from the dummy layer erasing notification section 1313, the display driver switching section 1322 counts down the number of generated dummy layers by one.

Then, in the case where the number of generated dummy layers is increased from zero to one, the display driver switching section 1322 outputs, to the driver switching notification section 1341 and to the screen data combining section 1321, a switching request for switching the display control to the display control driver 1013 of the secure virtual machine 101, and causes the screen data combining section 1321 to stop the display control. Thereby, the display control is switched from the non-secure virtual machine 102 to the secure virtual machine 101. Then, the display driver switching section 1322 outputs, to an interrupt delivery control section 1342, a switching request for switching the delivery destination of a drawing interrupt, which is generated in e.g. the display device 45, from the non-secure virtual machine 102 to the secure virtual machine 101.

On the other hand, in the case where the number of generated dummy layers becomes zero, the display driver switching section 1322 outputs, to the screen data combining section 1321 and to the driver switching notification section 1341, a switching request for switching the display control to the non-secure virtual machine 102, and stops the display control of the secure virtual machine 101. Thereby, the display control is switched from the display control driver 1013 in the secure virtual machine 101 to the display control driver 1023 in the non-secure virtual machine 102. Further, the display driver switching section 1322 outputs, to the interrupt delivery control section 1342, a switching request for switching the drawing interrupt delivery destination from the secure virtual machine 101 to the non-secure virtual machine 102.

In the case where the screen data combining section 1321 (an example of a first screen data combining section) receives, from the display driver switching section 1322, a switching request for switching the display control to the non-secure virtual machine, the screen data combining section 1321 combines the screen layers of the non-secure virtual machine 102, using the screen data representing the screen layers retained in the shared memory 1031, based on the screen layer management information 1441, and causes the display device 45 to display a combination result.

In this example, if the display combining engine 1002 is capable of performing a processing using the display order of screen layers, the display position and the size of each respective screen layer that have been described in the screen layer management information 1441, the screen data combining section 1321 may notify these information to the display combining engine 1002 so that the display combining engine 1002 combines the screen layers. In this case, the display combining engine 1002 may read out the screen data representing the each respective screen layer from the shared memory 1031 in accordance with the information notified from the screen data combining section 1321, combine the screen layers, and cause the display device 45 to display a combination result.

Further, in response to receiving, from the display driver switching section 1322, a switching request for switching the display control to the non-secure virtual machine 102, the screen data combining section 1321 sets the operation mode thereof to a combination start mode. On the other hand, in response to receiving, from the display driver switching section 1322, a switching request for switching the display control to the secure virtual machine 101, the screen data combining section 1321 sets the operation mode thereof to a combination stop mode.

In other words, in the case where the number of generated dummy layers is zero, the screen data combining section 1321 sets the operation mode thereof to the combination start mode; and in the case where the number of generated dummy layers is one or more, the screen data combining section 1321 sets the operation mode thereof to the combination stop mode. When the screen data combining section 1321 is in the combination start mode, the screen data combining section 1321 performs a screen layer combination processing, each time a drawing interrupt has occurred in the display device 45. On the other hand, when the screen data combining section 1321 is in the combination stop mode, the screen data combining section 1321 does not perform a screen layer combination processing, even if a drawing interrupt has occurred in the display device 45.

In the case where the display driver switching section 1322 switches the display control to the secure virtual machine 101, in response to occurrence of a drawing interrupt, the interrupt delivery control section 1342 delivers the drawing interrupt to the secure virtual machine 101 for causing a screen data combining section 1331 to combine the screen layers.

On the other hand, in the case where the display driver switching section 1322 switches the display control to the non-secure virtual machine 102, in response to occurrence of a drawing interrupt, the interrupt delivery control section 1342 delivers the drawing interrupt to the non-secure virtual machine 102 for causing the screen data combining section 1321 to combine the screen layers.

Specifically, in response to receiving, from the display driver switching section 1322, a switching request for switching the display control from the non-secure virtual machine 102 to the secure virtual machine 101, the interrupt delivery control section 1342 sets the drawing interrupt delivery destination to the secure virtual machine 101. In this case, the drawing interrupt is delivered to the screen data combining section 1331.

On the other hand, in response to receiving, from the display driver switching section 1322, a switching request for switching the display control from the secure virtual machine 101 to the non-secure virtual machine 102, the interrupt delivery control section 1342 sets the drawing interrupt delivery destination to the non-secure virtual machine 102. In this case, the drawing interrupt is delivered to the screen data combining section 1321.

In this example, the drawing interrupt may be e.g. an interrupt based on a vertical synchronization signal (VSYNC) of the display device 45, or a transmission completion interrupt to a screen buffer for the display combining engine 1002. The vertical synchronization signal is generated in accordance with a frame period of the display device 45, and is generated, for instance, every 1/60 second. Accordingly, a drawing interrupt occurs e.g. every 1/60 second.

In the case where the driver switching notification section 1341 receives, from the display driver switching section 1322, a switching request for switching the display control from the non-secure virtual machine 102 to the secure virtual machine 101, the driver switching notification section 1341 designates the screen data combining section 1331 in the secure virtual machine 101 to combine the screen layers.

On the other hand, in the case where the driver switching notification section 1341 receives, from the display driver switching section 1322, a switching request for switching the display control from the secure virtual machine 101 to the non-secure virtual machine 102, the driver switching notification section 1341 designates the screen data combining section 1331 to stop combining the screen layers.

In the case where the screen data combining section 1331 is designated, from the driver switching notification section 1341, to combine the screen layers in the secure virtual machine 101, the screen data combining section 1331 reads out the screen data retained in the non-shared memory 1030 and in the shared memory 1031, referring to the screen layer management information 1441, combines the screen layers of the secure virtual machine 101 and the non-secure virtual machine 102, and causes the display device 45 to display a combination result.

The secure virtual machine 101 retains screen layer management information for managing only the screen layers generated in the secure virtual machine 101. In view of the above, the screen data combining section 1331 may combine the screen layers, using screen layer management information in the secure virtual machine 101 and the screen layer management information 1441.

For instance, let us assume a case that the screen layer management information 1441 describes only the information relating to the display order of a dummy layer. In this case, since the display position and the size of the dummy layer are unknown, the screen data combining section 1331 is incapable of combining the screen layers only by the screen layer management information 1441. In such a case, the screen data combining section 1331 may combine the screen layers, using the screen layer management information 1441, and the screen layer management information in the secure virtual machine 101.

Figures 5A, 5B:
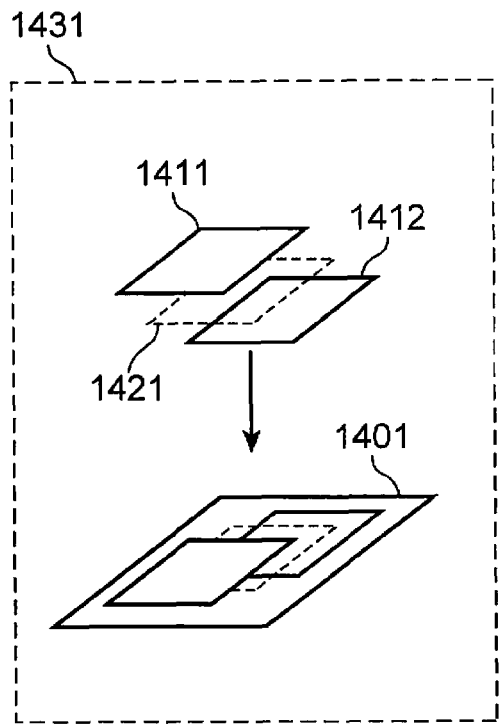
FIG. 5A is a diagram showing a relationship between a dummy layer and a screen layer of a non-secure virtual machine in screen layer management information shown in FIG. 5B.
FIG. 5B is a diagram showing an example of the screen layer management information to be managed by a display layer management section.

In this example, the screen layer management information in the secure virtual machine 101 has e.g. a data structure describing only the recorded data on a dummy layer, which is extracted from the screen layer management information shown in FIG. 5B. In other words, the screen layer management information in the secure virtual machine 101 includes e.g. the display order, the display position, the size, and the screen buffer pointer of each respective screen layer generated in the secure virtual machine.

In view of the above, the screen data combining section 1331 may at first refer to the screen layer management information 1441, and then refer to the screen layer information described in the screen layer management information in the secure virtual machine 101 regarding a dummy layer, for drawing the screen layers.

For instance, let us assume that the screen layer management information 1441 manages two screen layers of the non-secure virtual machine 102 and two dummy layers, and the screen layer management information in the secure virtual machine 101 manages two screen layers in the secure virtual machine. Further, let us assume that in the screen layer management information 1441, the screen layers of the non-secure virtual machine 102 are a first layer and a third layer in the display order, and the dummy layers are a second layer and a fourth layer in the display order.

In this case, the screen data combining section 1331 may replace the dummy layer as the second layer in the screen layer management information 1441 with the screen layer as a first layer in the screen layer management information in the secure virtual machine 101, and may replace the dummy layer as the fourth layer in the screen layer management information 1441 with the screen layer as a second layer in the screen layer management information in the secure virtual machine 101, for combining the screen layers.

Further alternatively, the screen data combining section 1331 may cause the display combining engine 1002 to combine the screen layers in the same manner as the screen data combining section 1321.

In response to receiving a screen layer generation notification from the application 1010, the display layer management section 1332 registers the generated screen layer into the screen layer management information in the secure virtual machine 101, based on the presumption that a screen layer has been generated in the secure virtual machine. On the other hand, in response to receiving a screen layer finishing notification from the application 1010, the display layer management section 1332 erases the target screen layer from the screen layer management information in the secure virtual machine 101.

In this example, the screen layer management information in the secure virtual machine 101 has e.g. a data structure such that the dummy layer information is excluded from the screen layer management information 1441 shown in FIG. 5B. The memory buffer pointer in the screen layer management information in the secure virtual machine 101 employs the address of the screen buffer secured by the dummy layer registration notification section 1312 at the time of generation of a dummy layer.

FIG. 5B is a diagram showing an example of the screen layer management information 1441 to be managed by the display layer management section 1311. FIG. 5A is a diagram showing a relationship between a dummy layer and a screen layer in the non-secure virtual machine 102 in the screen layer management information 1441 shown in FIG. 5B.

As shown in FIG. 5B, the screen layer management information 1441 has a data structure in the format of a two-dimensional lookup table, in which one record is assigned to one screen layer. Further, the screen layer management information 1441 is provided with a display order field 1451, a coordinate field 1452, a size field 1453, a memory buffer pointer field 1454, and a dummy layer information field 1455.

The display order field 1451 stores therein the display order of screen layers. The coordinate field 1452 stores therein a coordinate (x, y) to be used in disposing a screen layer on a display screen. The coordinate may be a coordinate at e.g. the uppermost and leftmost vertex in a screen layer.

The size field 1453 stores therein the size of a screen layer. In this embodiment, since a screen layer has a rectangular shape, the size is defined by "WIDTH" representing the width of the screen layer, and by "HEIGHT" representing the height of the screen layer.

The memory buffer pointer field 1454 stores therein the address of a screen buffer as a storage destination of screen data representing a screen layer. The dummy layer information field 1455 stores therein dummy layer information indicating whether the screen layer is a dummy layer or not. In the example shown in FIG. 5B, the dummy layer is attached with the symbol "○" indicating that the information is dummy layer information, and the screen layers other than the dummy layer i.e. the screen layers of the non-secure virtual machine 102 are attached with the symbol "x" indicating that the information is not dummy layer information.

The diagram within a frame 1431 shown in FIG. 5A illustrates a processing of combining three screen layers in a display screen 1401 of the display device 45. In the example shown in FIG. 5A, the three screen layers 1411, 1412, 1421 are combined in the display screen 1401. In this example, the screen layers are placed one over the other in the order of 1411, 1421, 1412. Accordingly, the screen layers 1411, 1421, 1412 are registered in the record representing the display order 1, 2, 3 in the screen layer management information

1441. It is needless to say that management may be performed by the list of the pointers, in place of management by the ordinal number of display order.

In the example shown in FIG. 5B, the screen layer whose display order is the first is located at the coordinate (10, 100) in the screen window, and the first screen layer has a size (width=120, height=130). The memory buffer for storing the screen data is located at the address (0x41000000), which shows that the screen layer is not a dummy layer.

Further, the screen layer whose display order is the second has the mark "○" in the dummy layer information field 1455, and accordingly, is a dummy layer. In this case, the coordinate, the size and the memory buffer pointer of the dummy layer are not requisite items. In other words, in the case where the screen data combining section 1331 combines the screen layers using the screen layer management information in the secure virtual machine 101, in addition to the screen layer management information 1441, recording of the coordinate, the size, and the memory buffer of a dummy layer into the screen layer management information 1441 may be omitted.

In the example shown in FIG. 5B, a dummy layer is identified by the symbols "○", "x" as the dummy layer information. Alternatively, as far as the presence or absence of a dummy layer is identifiable, any information may be used. In the example shown in FIG. 5B, since there exists a dummy layer, not the screen data combining section 1321 in the non-secure virtual machine 102 but the screen data combining section 1331 in the secure virtual machine 101 combines the screen layers based on the screen layer management information 1441.

FIG. 6 is a flowchart showing a processing to be performed in the case where a dummy layer is registered into the screen layer management information 1441. Firstly, in response to receiving a screen layer generation notification from the application 1010, the dummy layer generating/finishing section 1301 generates a dummy layer based on a determination that a screen layer has been generated in the secure virtual machine 101, and outputs a dummy layer generation notification to the dummy layer registration notification section 1312 (Step S1501).

Then, the dummy layer registration notification section 1312 outputs a dummy layer generation notification to the display driver switching section 1322 (Step S1502). Then, the dummy layer registration notification section 1312 outputs a dummy layer generation notification to the display layer management section 1311 (Step S1503). Then, the display layer management section 1311 determines the display order of the dummy layer, and registers the dummy layer into the screen layer management information 1441 (Step S1504).

In this embodiment, the display order of a screen layer is set in such a manner that e.g. a latest screen layer is located as an uppermost layer. In view of the above, the display layer management section 1311 sets the display order of the generated dummy layer as a first screen layer. In this example, the display layer management section 1311 decrements the display order of other registered screen layers by one for each respective registered screen layer, and sets the other registered screen layers to the second screen layer and thereafter. In other words, in this embodiment, the display order of screen layers is set in the order of generation.

Since the display layer management section 1311 also manages the screen layers of the non-secure virtual machine 102, if a screen layer is generated in the non-secure virtual machine 102, the display order of the generated screen layer is set as an uppermost layer.

FIG. 7 is a flowchart showing a processing to be performed in the case where a registered dummy layer is erased from the screen layer management information 1441.

Firstly, in response to receiving a screen layer finishing notification from the application 1010, the dummy layer generating/finishing section 1301 outputs, to the dummy layer erasing notification section 1313, a request for erasing a dummy layer corresponding to the target screen layer (Step S1601). Then, the dummy layer erasing notification section 1313 outputs a dummy layer erasing notification to the display driver switching section 1322 (Step S1602).

Then, the dummy layer erasing notification section 1313 requests the display layer management section 1311 to erase the dummy layer corresponding to the target screen layer from the screen layer management information 1441 (Step S1603). Then, the display layer management section 1311 erases the corresponding dummy layer from the screen layer management information 1441 (Step S1604).

For instance, in outputting an erasing request to the dummy layer erasing notification section 1313, the dummy layer generating/finishing section 1301 may cause the erasing request to carry identification information of a dummy layer to be erased. Then, the dummy layer erasing notification section 1313 may notify the display layer management section 1311 of the identification information so that the display layer management section 1311 erases the dummy layer designated by the identification information from the screen layer management information 1441.

FIG. 8 is a flowchart showing a processing to be performed in the case where the display driver switching section 1322 receives a dummy layer generation notification from the dummy layer registration notification section 1312. The display driver switching section 1322 receives a dummy layer generation notification from the dummy layer registration notification section 1312 (Step S1701).

Then, the display driver switching section 1322 checks whether the number of generated dummy layers to be managed by the display driver switching section 1322 is zero (Step S1702). Then, in the case where the number of generated dummy layers is not zero (NO in Step S1702), the display driver switching section 1322 increments the number of generated dummy layers by one (Step S1706), and terminates the processing. On the other hand, in the case where the number of generated dummy layers is zero (YES in Step S1702), the display driver switching section 1322 outputs, to the screen data combining section 1321, a switching request for switching the display control to the secure virtual machine 101 (Step S1703).

Then, the display driver switching section 1322 outputs, to the driver switching notification section 1341, a switching request for switching the display control to the secure virtual machine 101 (Step S1704). Then, the display driver switching section 1322 outputs, to the interrupt delivery control section 1342, a switching request for switching the drawing interrupt delivery destination to the secure virtual machine 101 (Step S1705). Then, the display driver switching section 1322 increments the number of generated dummy layers by one (Step S1706), and terminates the processing.

As described above, the display driver switching section 1322 manages the number of generated dummy layers. If at least one dummy layer is generated, the display driver switching section 1322 switches the display from the non-secure virtual machine 102 to the secure virtual machine 101.

Figure 9:
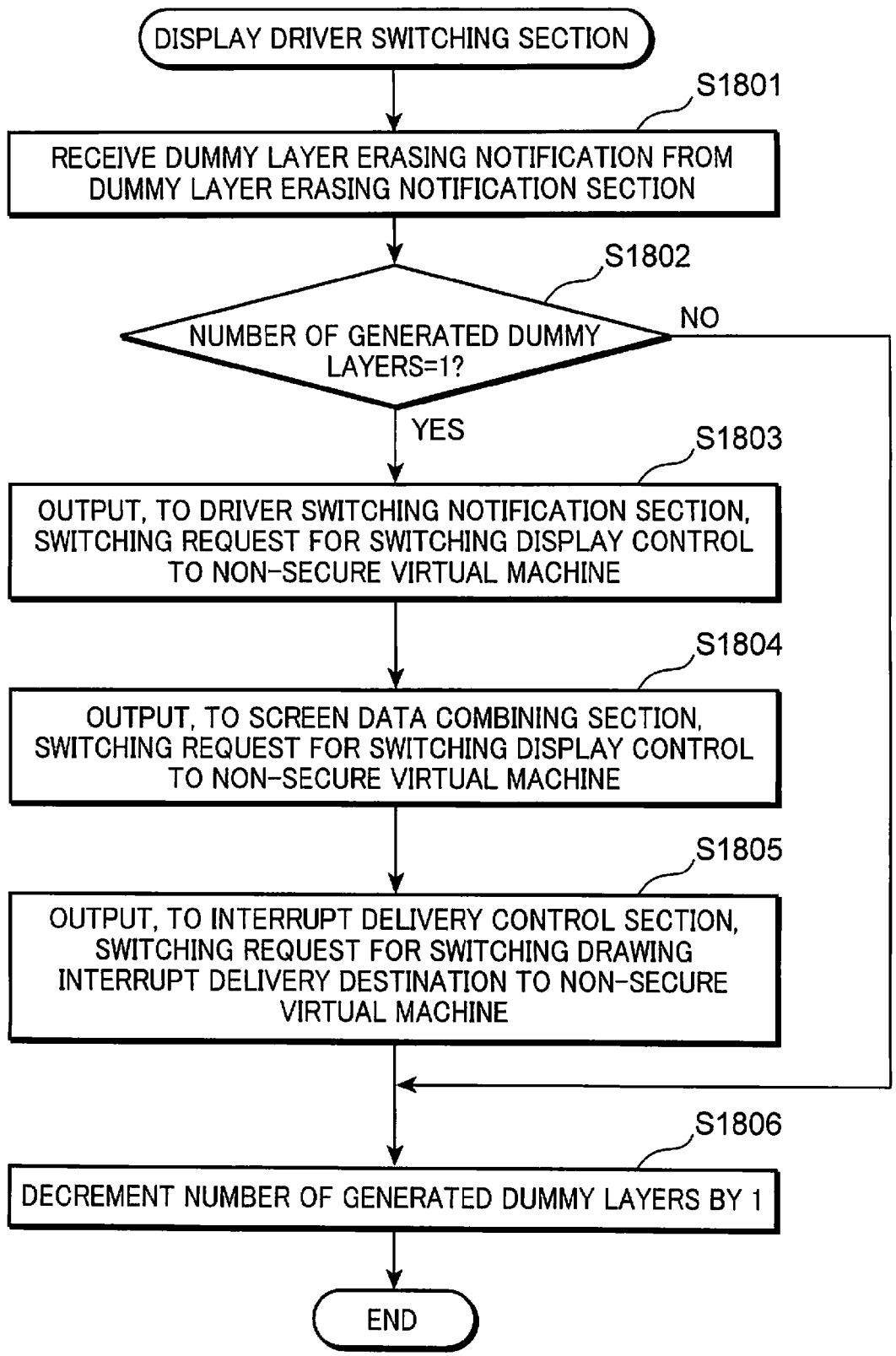
FIG. 9 is a flowchart showing a processing to be performed in the case where the display driver switching section receives a dummy layer erasing notification from a dummy layer erasing notification section.

FIG. 9 is a flowchart showing a processing to be performed in the case where the display driver switching section 1322 receives a dummy layer erasing notification from the dummy layer erasing notification section 1313. Firstly, the display driver switching section 1322 receives a dummy layer erasing notification from the dummy layer erasing notification section 1313 (Step S1801). Then, the display driver switching section 1322 checks whether the number of generated dummy layers to be managed by the display driver switching section 1322 is one (Step S1802). Then, in the case where the number of generated dummy layers is not one (NO in Step S1802), the display driver switching section 1322 decrements the number of generated dummy layers by one (Step S1806), and terminates the processing. On the other hand, in the case where the number of generated dummy layers is one (YES in Step S1802), the display driver switching section 1322 outputs, to the driver switching notification section 1341, a switching request for switching the display control to the non-secure virtual machine 102 (Step S1803). Then, the display driver switching section 1322 outputs, to the screen data combining section 1321, a switching request for switching the display control to the non-secure virtual machine 102 (Step S1804). Then, the display driver switching section 1322 outputs, to the interrupt delivery control section 1342, a switching request for switching the drawing interrupt delivery destination to the non-secure virtual machine 102 (Step S1805). Then, the display driver switching section 1322 decrements the number of generated dummy layers by one (Step S1806), and terminates the processing.

By performing the above operation, if the number of generated dummy layers is one or more, the display control is performed on the side of the secure virtual machine 101; and if the number of generated dummy layers is decremented from one to zero, the display control is switched from the secure virtual machine 101 to the non-secure virtual machine 102.

Figure 10:
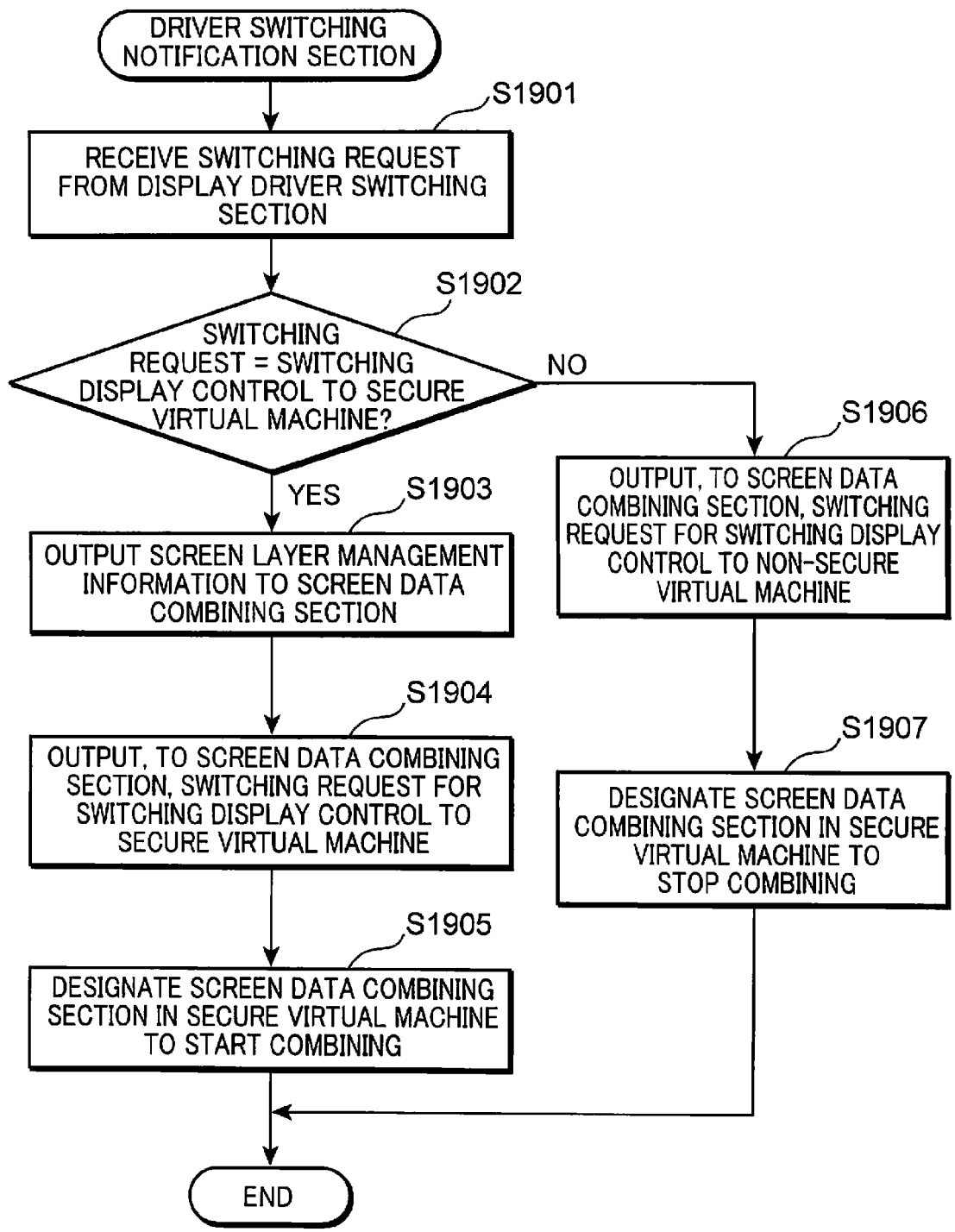
FIG. 10 is a flowchart showing a processing to be performed in the case where a driver switching notification section receives a display control switching request from the display driver switching section, and switches the display control to a secure virtual machine.

FIG. 10 is a flowchart showing a processing to be performed in the case where the driver switching notification section 1341 receives a display control switching request from the display driver switching section 1322 for switching the display control to the secure virtual machine 101. Firstly, the driver switching notification section 1341 receives a display control switching request from the display driver switching section 1322 (Step S1901). Then, the driver switching notification section 1341 determines whether the received switching request is a switching request for switching the display control to the secure virtual machine 101 (Step S1902). In this example, there are defined in advance a code string to be used in the case where the display control is switched from the non-secure virtual machine 102 to the secure virtual machine 101, and a code string to be used in the case where the display control is switched from the secure virtual machine 101 to the non-secure virtual machine 102. In this configuration, the driver switching notification section 1341 may perform the determination in Step S1902 in accordance with a determination result as to which one of the code strings, the code string as represented by the switching request corresponds to.

Then, in the case where the switching request is determined to be the switching request for switching the display control to the secure virtual machine 101 (YES in Step S1902), the driver switching notification section 1341 acquires the screen layer management information 1441 from the display layer management section 1311 via the screen data combining section 1321, and outputs the acquired screen layer management information 1441 to the screen data combining section 1331 (Step S1903).

Then, the driver switching notification section 1341 outputs, to the screen data combining section 1331 in the secure virtual machine 101, the switching request for switching the display control to the secure virtual machine 101 (Step S1904).

Then, the driver switching notification section 1341 designates the screen data combining section 1331 in the secure virtual machine 101 to start a screen layer combination processing (Step S1905).

On the other hand, in the case where the switching request is determined to be the switching request for switching the display control to the non-secure virtual machine 102 (NO in Step S1902), the driver switching notification section 1341 outputs, to the screen data combining section 1331 in the secure virtual machine 101, the switching request for switching the display control to the non-secure virtual machine 102 (Step S1906).

Then, the driver switching notification section 1341 designates the data combining section 1331 in the secure virtual machine 101 to stop combining the screen layers (Step S1907), and terminates the processing.

Figure 11:
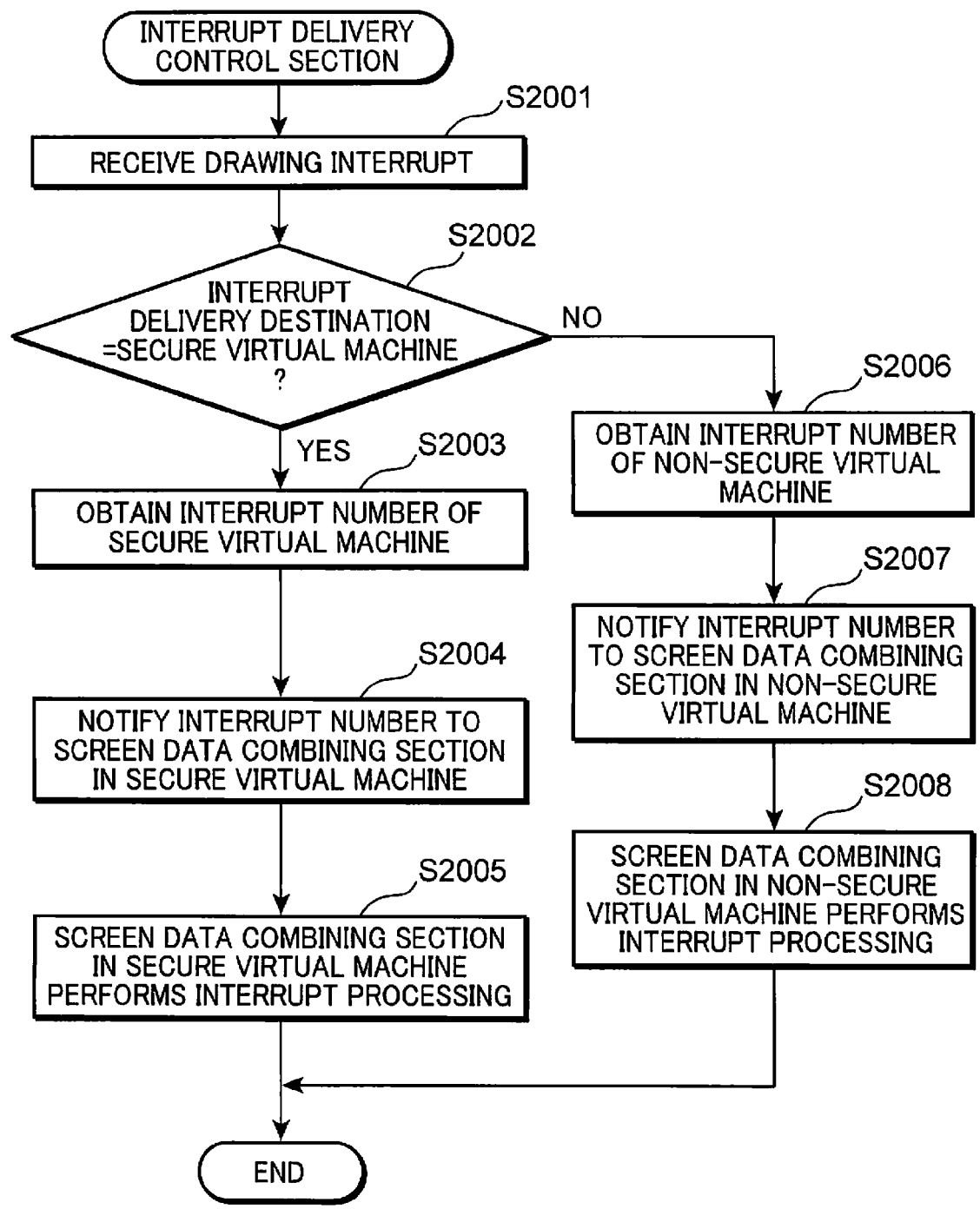
FIG. 11 is a flowchart showing a processing to be performed in the case where an interrupt delivery control section receives a drawing interrupt, and delivers the drawing interrupt to each respective virtual machine.

FIG. 11 is a flowchart showing a processing to be performed in the case where the interrupt delivery control section 1342 receives a drawing interrupt, and delivers the drawing interrupt to each respective virtual machine. Firstly, the interrupt delivery control section 1342 receives a drawing interrupt from the display device 45 (Step S2001). Then, the interrupt delivery control section 1342 determines whether a current interrupt delivery destination is set to the secure virtual machine 101 (Step S2002). In this example, in the case where the interrupt delivery control section 1342 receives, from the display driver switching section 1322, a switching request for switching the interrupt delivery destination to the non-secure virtual machine 102 by the processing of Step S1805 shown in FIG. 9, the interrupt delivery control section 1342 may determine that the interrupt delivery destination is set to the non-secure virtual machine 102. On the other hand, in the case where the interrupt delivery control section 1342 receives, from the display driver switching section 1322, a switching request for switching the interrupt delivery destination to the secure virtual machine 101 by the processing of Step S1705 shown in FIG. 8, the interrupt delivery control section 1342 may determine that the interrupt delivery destination is set to the secure virtual machine 101.

Then, in the case where the interrupt delivery destination is set to the secure virtual machine 101 (YES in Step S2002), the interrupt delivery control section 1342 obtains the interrupt number of the drawing interrupt of the secure virtual machine 101, which has been received in Step S2001 (Step S2003).

In this example, the interrupt delivery control section 1342 holds in advance an interrupt vector table, in which the interrupt number to be managed by the non-secure virtual machine 102 and the interrupt number to be managed by the secure virtual machine 101 are correlated to each other for each of the types of interrupts. In this configuration, the interrupt delivery control section 1342 may obtain the interrupt number of the drawing interrupt of the secure virtual machine 101, referring to the interrupt vector table.

Then, the interrupt delivery control section 1342 notifies the obtained interrupt number to the screen data combining section 1331 in the secure virtual machine 101 (Step S2004). Then, the screen data combining section 1331 performs a drawing interrupt processing by reading out a processing program for a drawing interrupt in accordance with the notified interrupt number (Step S2005). By performing the drawing interrupt processing, the screen data combining section 1331 combines the screen layers of the non-secure virtual machine 102 and the screen layer of the secure virtual machine 101.

On the other hand, in the case where the interrupt delivery destination is not the secure virtual machine 101 but the non-secure virtual machine (NO in Step S2002), the interrupt delivery control section 1342 obtains the interrupt number of the drawing interrupt of the non-secure virtual machine 102, which has been received in Step S2001 (Step S2006). Then, the interrupt delivery control section 1342 notifies the obtained interrupt number to the screen data combining section 1321 in the non-secure virtual machine 102 (Step S2007).

Then, the screen data combining section 1321 in the non-secure virtual machine 102 performs a drawing interrupt processing by reading out a processing program for a drawing interrupt in accordance with the notified interrupt number (Step S2008). In this example, the screen data combining section 1321 performs a processing of combining the screen layers of the non-secure virtual machine 102.

In the flowchart, a drawing interrupt is an interrupt (VSYNC interrupt) based on a vertical synchronization signal to be generated by the display device 45, each time a frame period elapses. Accordingly, the flowchart shown in FIG. 11 is executed each time a frame period elapses. Specifically, the interrupt delivery control section 1342 determines whether a current drawing interrupt delivery destination is the secure virtual machine or the non-secure virtual machine, each time a VSYNC interrupt occurs; delivers the drawing interrupt to the screen data combining section 1331 if it is determined that the delivery destination is the secure virtual machine; and delivers the drawing interrupt to the screen data combining section 1321 if it is determined that the delivery destination is the non-secure virtual machine. By performing the above operation, the screen to be displayed on the display device 45 is updated, each time a frame period elapses.

Figure 12:
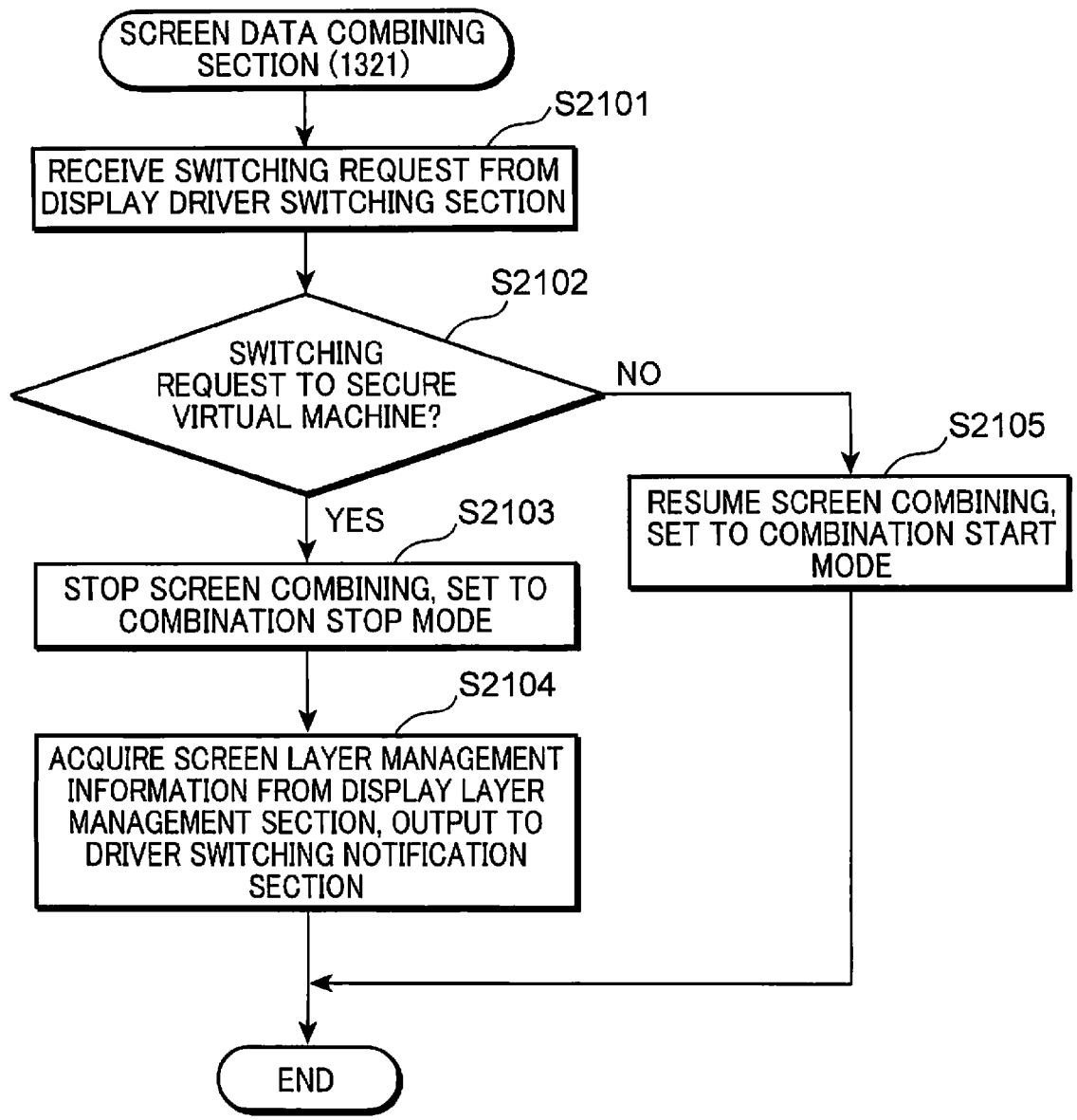
FIG. 12 is a flowchart showing a processing to be performed in the case where a screen data combining section receives a display control switching request from the display driver switching section.

FIG. 12 is a flowchart showing a processing to be performed in the case where the screen data combining section 1321 receives a display control switching request from the display driver switching section 1322. Firstly, the screen data combining section 1321 receives a display control switching request from the display driver switching section 1322 (Step S2101). Then, the screen data combining section 1321 determines whether the received switching request is a switching request for switching the display control from the non-secure virtual machine 102 to the secure virtual machine 101 (Step S2102). In this example, there are defined in advance a code string to be used in the case where the display control is switched from the non-secure virtual machine 102 to the secure virtual machine 101, and a code string to be used in the case where the display control is switched from the secure virtual machine 101 to the non-secure virtual machine 102. In this configuration, the screen data combining section 1321 may perform the determination in Step S2102 in accordance with a determination result as to which one of the code strings, the code string represented by the switching request corresponds to.

Then, in the case where the screen data combining section 1321 determines that the received switching request is a switching request for switching the display control to the secure virtual machine 101 (YES in Step S2102), the screen data combining section 1321 stops the screen layer combination processing, and sets the operation mode thereof to the combination stop mode (Step S2103). Then, the screen data combining section 1321 acquires the screen layer management information 1441 from the display layer management section 1311, and outputs the acquired screen layer management information 1441 to the driver switching notification section 1341 (Step S2104).

On the other hand, in the case where the screen data combining section 1321 determines that the received switching request is not a switching request for switching the display control to the secure virtual machine 101 (NO in Step S2102), the screen data combining section 1321 resumes the screen layer combination processing, and sets the operation mode thereof to the combination start mode (Step S2105).

As described above, in the case where the screen data combining section 1321 receives a switching request for switching the display control to the secure virtual machine 101, the screen data combining section 1321 sets the operation mode thereof to the combination stop mode, and outputs the screen layer management information 1441 to the screen data combining section 1331 via the driver switching notification section 1341 for combining the screen layers by the screen data combining section 1331. On the other hand, in the case where the screen data combining section 1321 receives a switching request for switching the display control to the non-secure virtual machine 102, the screen data combining section 1321 sets the operation mode thereof to the combination start mode for combining the screen layers.

Figure 13:
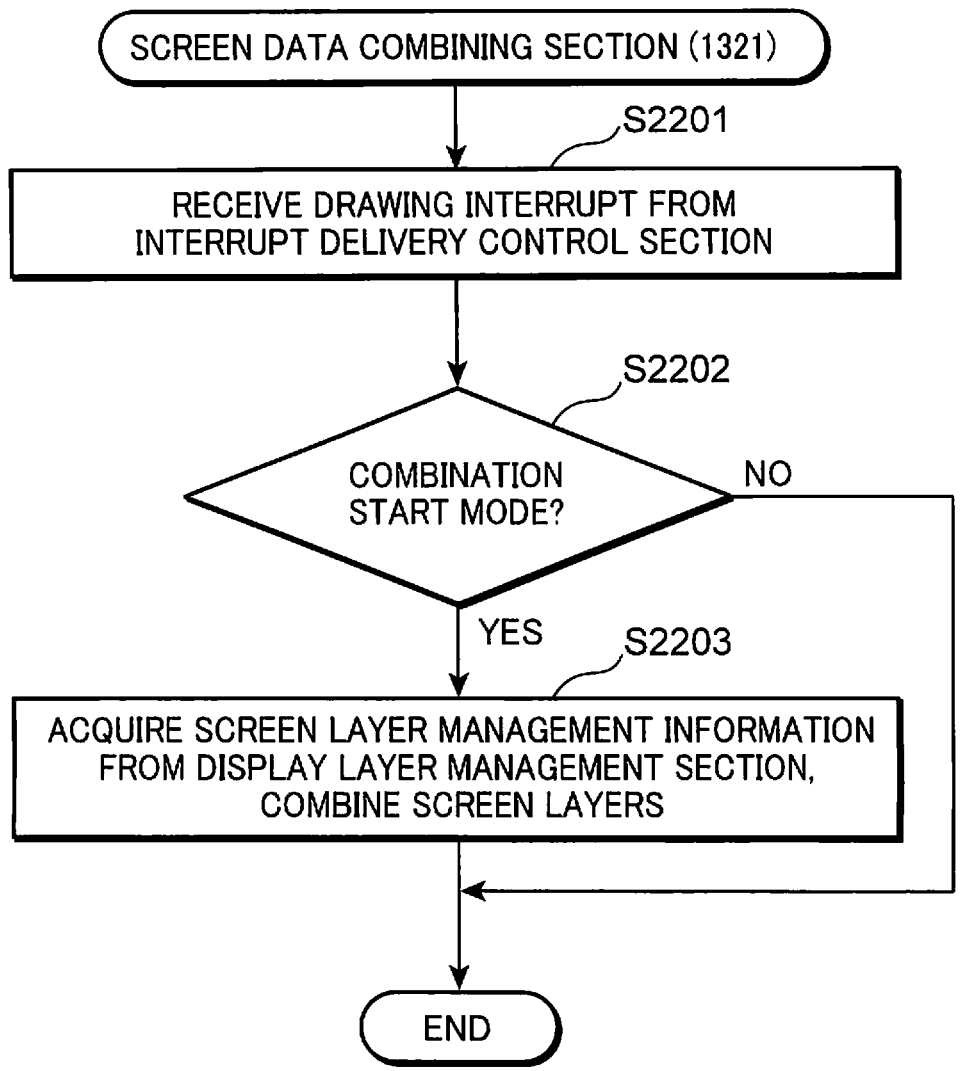
FIG. 13 is a flowchart showing a processing to be performed in the case where the screen data combining section receives a drawing interrupt from the interrupt delivery control section, and combines screen layers.

FIG. 13 is a flowchart to be performed in the case where the screen data combining section 1321 receives a drawing interrupt from the interrupt delivery control section 1342, and combines the screen layers. Firstly, the screen data combining section 1321 receives a drawing interrupt from the interrupt delivery control section 1342 (Step S2201).

Then, the screen data combining section 1321 determines whether the screen data combing section 1321 is in the combination start mode (Step S2202). In this example, the screen data combining section 1321 manages a flag indicating whether the screen data combining section 1321 is in the combination start mode, and determines whether the screen data combing section 1321 is in the combination start mode based on a status of the flag. For instance, in the case where the flag is set to 1 and the flag is on, it may be determined that the screen data combining section 1321 is in the combination start mode; and in the case where the flag is set to 0 and the flag is off, it may be determined that the screen data combining section 1321 is in the combination stop mode.

Then, in the case where the screen data combining section 1321 is in the combination start mode (YES in Step S2202), the screen data combining section 1321 acquires the screen layer management information 1441 from the display layer management section 1311, and combines the screen layers (Step S2203). In this example, the screen data combining section 1321 may read out the screen data representing the screen layer of the non-secure virtual machine 102, which is held in the shared memory 1031, and may combine the screen layers in the display order defined in the screen layer management information 1441.

On the other hand, in the case where the screen data combining section 1321 is in the combination stop mode (NO in Step S2202), the routine is ended without performing any processing.

As described above, in the case where the screen data combining section 1321 receives a drawing interrupt, the screen data combining section 1321 combines the screen layers if the screen data combining section 1321 is in the combination start mode; and the screen data combining section 1321 does not combine the screen layers if the screen data combining section 1321 is in the combination stop mode.

FIG. 13 shows an example that the screen data combining section 1321 performs the processing, using a drawing interrupt as a trigger. Alternatively, the screen data combining section 1321 may perform the processing asynchronously of a drawing interrupt. Specifically, a screen layer combination processing may be performed at a point of time when a drawing request has occurred, without waiting for occurrence of a drawing interrupt. Examples of a point of time when a drawing request occurs are a point of time when a new screen layer is generated in the non-secure virtual machine 102, a point of time when the display position of an existing screen layer is changed, and a point of time when the size of an existing screen layer is changed. Further alternatively, the screen data combining section 1321 may combine the screen layers at a point of time when a drawing request has occurred, in addition to a point of time when a drawing interrupt has occurred.

Figure 14:
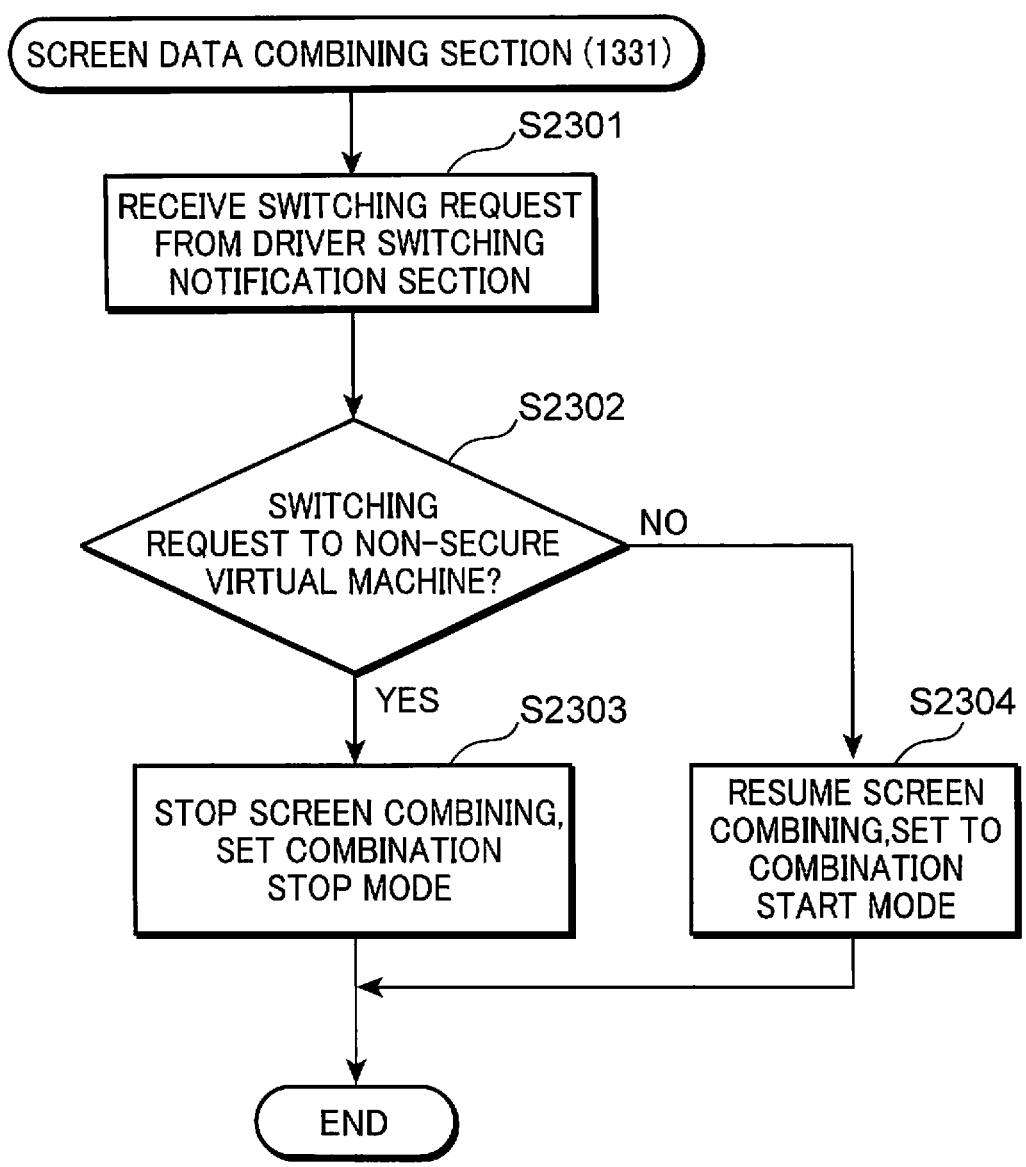
FIG. 14 is a flowchart showing a processing to be performed in the case where the screen data combining section of a secure virtual machine receives a display control switching request from the driver switching notification section.

FIG. 14 is a flowchart showing a processing to be performed in the case where the screen data combining section 1331 in the secure virtual machine 101 receives a display control switching request from the driver switching notification section 1341. Firstly, the screen data combining section 1331 receives a display control switching request from the driver switching notification section 1341 (Step S2301). Then, the screen data combining section 1331 determines whether the received switching request is a switching request for switching the display control to the non-secure virtual machine 102 (Step S2302). In this example, there are defined in advance a code string to be used in the case where the display control is switched from the non-secure virtual machine 102 to the secure virtual machine 101, and a code string to be used in the case where the display control is switched from the secure virtual machine 101 to the non-secure virtual machine 102. In this configuration, the screen data combining section 1331 may perform the determination in Step S2302 in accordance with a determination result as to which one of the code strings, the code string as represented by the switching request corresponds to.

Then, in the case where the screen data combining section 1331 determines that the received switching request is a switching request for switching the display control to the non-secure virtual machine 102 (YES in Step S2302), the screen data combining section 1331 stops the screen layer combination processing, and sets the operation mode thereof to the combination stop mode (Step S2303).

On the other hand, in the case where the screen data combining section 1331 determines that the received switching request is a switching request for switching the display control to the secure virtual machine 101 (NO in Step S2302), the screen data combining section 1331 resumes the screen layer combination processing, and sets the operation mode thereof to the combination start mode (Step S2304).

Figure 15:
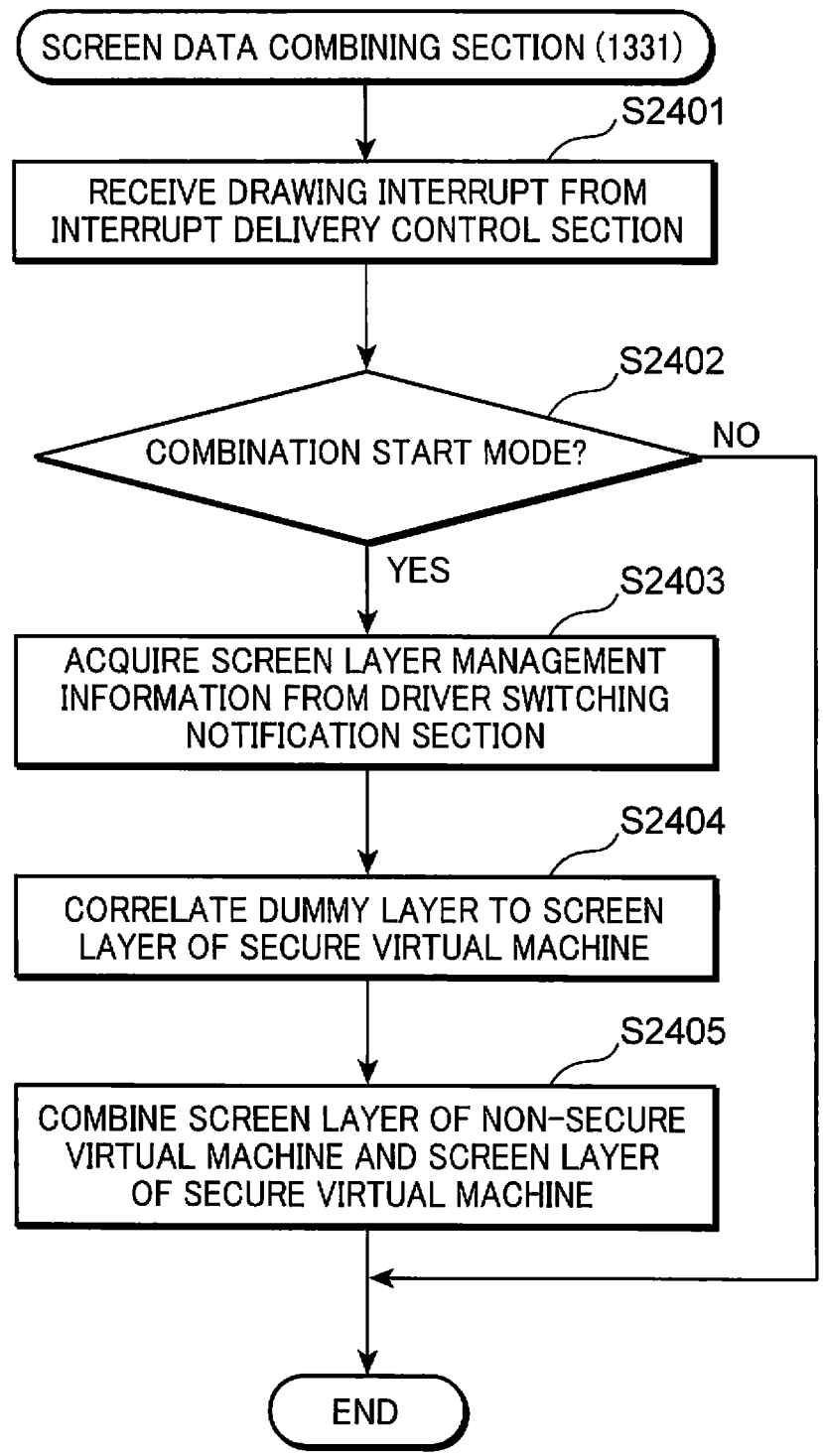
FIG. 15 is a flowchart showing a processing to be performed in the case where the screen data combining section receives a drawing interrupt from the interrupt delivery control section.

FIG. 15 is a flowchart showing a processing to be performed in the case where the screen data combining section 1331 receives a drawing interrupt from the interrupt delivery control section 1342. Firstly, the screen data combining section 1331 receives, from the interrupt delivery control section 1342, a drawing interrupt from the display device 45 (Step S2401).

Then, the screen data combining section 1331 determines whether the screen data combining section 1331 is in the combination start mode (Step S2402). In this example, the screen data combining section 1331 manages information as to whether the screen data combining section 1331 is in the combination start mode as a flag, and determines whether the screen data combining section 1331 is in the combination start mode based on a status of the flag.

Then, in the case where the screen data combining section 1331 is in the combination start mode (YES in Step S2402), the screen data combining section 1331 acquires the screen layer management information 1441 from the driver switching notification section 1341 (Step S2403).

Then, the screen data combining section 1331 correlates each respective dummy layer managed by the acquired screen layer management information 1441 to the secure virtual machine 101 (Step S2404). In this example, the screen data combining section 1331 acquires the screen layer management information of the secure virtual machine 101 from the display layer management section 1332, and specifies the screen layer of the secure virtual machine 101 corresponding to each respective dummy layer by performing a matching operation between the display order of the screen layers defined in the acquired screen layer management information, and the display order of the dummy layers defined in the screen layer management information 1441.

Then, the screen data combining section 1331 combines the screen layers of the non-secure virtual machine 102 and the screen layer of the secure virtual machine 101 (Step S2405).

In this example, the screen data combining section 1331 reads out, from the non-shared memory 1030, the screen data representing the screen layer of the secure virtual machine 101 that has been correlated to the dummy layer in Step S2404, and reads out, from the shared memory 1031, the screen data representing the screen layer of the non-secure virtual machine 102 for combining the readout screen data in the display order defined in the screen layer management information 1441 (Step S2405).

FIG. 15 shows an example, wherein the screen data combining section 1331 combines screen layers, using a drawing interrupt from the display device 45 as a trigger. Alternatively, the screen data combining section 1331 may perform the processing asynchronously of a drawing interrupt. Specifically, a screen data combination processing may be performed at a point of time when a drawing request has occurred, without waiting for occurrence of a drawing interrupt. Examples of a point of time when a drawing request occurs are a point of time when a new screen layer is generated in the secure virtual machine 101 and in the non-secure virtual machine 102, a point of time when the display position of an existing screen layer is changed, and a point of time when the size of an existing screen layer is changed. Further alternatively, the screen data combining section 1331 may combine screen layers at a point of time when a drawing request has occurred, in addition to a point of time when a drawing interrupt has occurred.

By performing the above operations, it is possible to configure the virtual machine display device 10 in such a manner as to prevent the non-secure virtual machine 102 from accessing a screen layer of the secure virtual machine 101, and to combine different screen layers to be outputted from the secure virtual machine 101 and the non-secure virtual machine 102 in the display order, while suppressing the switching processing between the secure virtual machine 101 and the non-secure virtual machine 102.

Second Embodiment

In the virtual machine display device 10 of the first embodiment, in the case where a certain alteration is added to a screen of the secure virtual machine 101 in a state that the screen of the secure virtual machine 101 is displayed on the display device 45, the screen data combining section 1331 in the secure virtual machine 101 is required to combine the screen layers again for creating a screen. Typically, adding a certain alteration to a screen may be enlarging/reducing the window size, updating an on-screen image, imparting an effect such as shading or darkening a screen layer, or rotating a screen layer.

In this example, the screen data combining section 1331 combines all the screen layers, including a screen layer of the non-secure virtual machine 102, each time a screen layer of the secure virtual machine 101 is updated.

If the aforementioned operation is performed, the processing load and the processing time of the screen data combining section 1331 increase. In view of the above, it is preferable to pre-combine the screen layers of the non-secure virtual machine 102 by the screen data combining section 1321, and combine the combination result and the rest of the screen layers of the secure virtual machine 101 by the screen data combining section 1331.

However, the screen data has information relating to a transmittance (α value). In the case where a semi-transparent screen is drawn, the non-secure virtual machine 102 is unable to know the α value of the screen layer of the secure virtual machine 101, because accessing to the shared memory 1031 by the non-secure virtual machine 102 is prohibited.

Accordingly, for instance, in the case where a screen layer of the non-secure virtual machine 102 and a screen layer of the secure virtual machine 101 are alternately placed one over the other, if the screen data combining section 1321 pre-combines all the screen layers of the non-secure virtual machine, the screen data combining section 1331 is unable to reproduce a semi-transparent screen in accordance with the α value of each respective screen layer.

In view of the above, the second embodiment is configured in such a manner that screen layers that are pre-combinable by a screen data combining section 1321 are specified so that a screen data combining section 1331 can reproduce a semi-transparent image in accordance with the α value of each respective screen layer; the specified screen layers are pre-combined by the screen data combining section 1321; and the combination result is combined with the rest of the screen layers by the screen data combining section 1331.

By performing the above operation, it is possible to suppress the processing load of the screen data combining section 1331 required in the case where a screen layer of the secure virtual machine 101 is updated.

Figure 16:
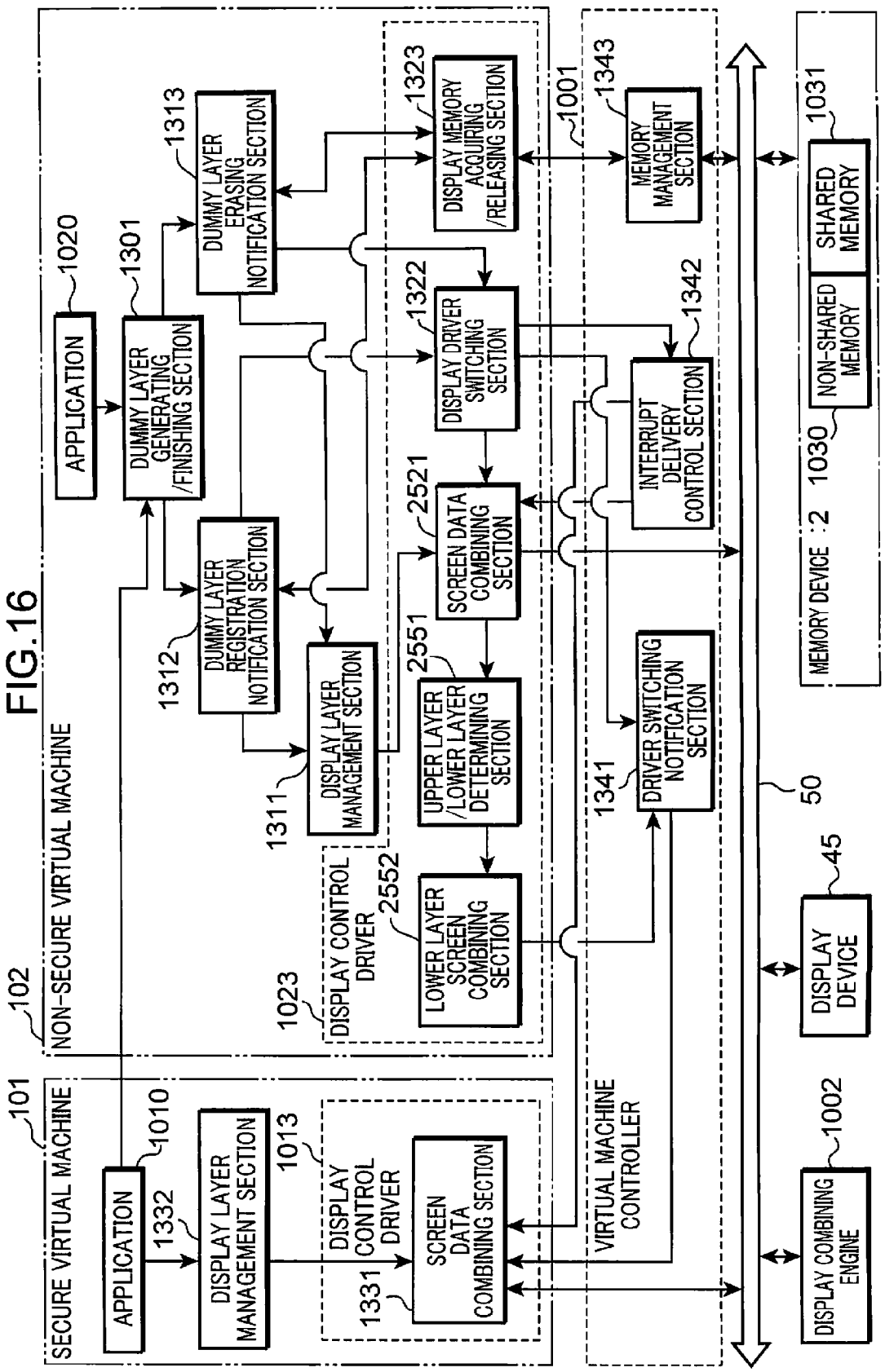
FIG. 16 is a block diagram showing a detailed configuration of a virtual machine display device in a second embodiment of the invention.

FIG. 16 is a block diagram showing a detailed configuration of a virtual machine display device 10 in the second embodiment of the invention. Referring to FIG. 16, elements substantially identical or equivalent to those shown in FIG. 4 are indicated with the same reference signs as those shown in FIG. 4, and the description thereof is omitted herein.

In the virtual machine display device 10 in the second embodiment, an upper layer/lower layer determining section 2551 and a lower layer screen combining section 2552 are provided in addition to the elements of the first embodiment.

Figure 17:
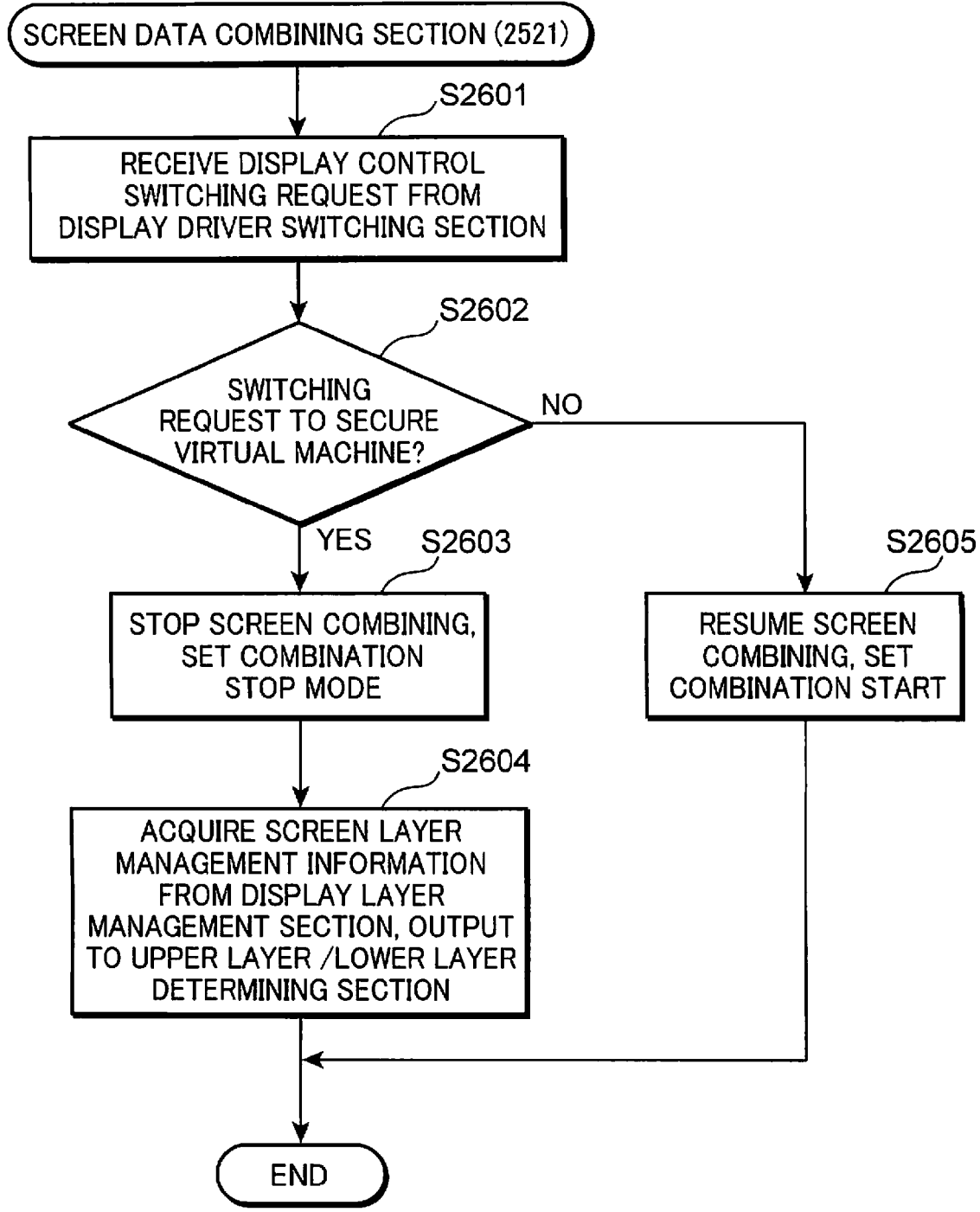
FIG. 17 is a flowchart showing a processing to be performed in the case where a screen data combining section receives a display driver switching request from a display driver switching section.

FIG. 17 is a flowchart showing a processing to be performed in the case where a screen data combining section 2521 receives a display driver switching request from a display driver switching section 1322. Firstly, the display data combining section 2521 receives a display control switching request from the display driver switching section 1322 (Step S2601). Then, the screen data combining section 2521 determines whether the switching request is a switching request for switching the display control to a secure virtual machine 101 (Step S2602). The determination processing is the same as in the first embodiment.

Then, in the case where the switching request is a switching request for switching the display control to the secure virtual machine 101 (YES in Step S2602), the screen data combining section 2521 stops a screen layer combination processing, and sets the operation mode thereof to the combination stop mode (Step S2603). Then, the screen data combining section 2521 acquires screen layer management information 1441 from a display layer management section 1311, and outputs the acquired screen layer management information 1441 to the upper layer/lower layer determining section 2551 (Step S2604).

On the other hand, in the case where the switching request is not a switching request for switching the display control to the secure virtual machine 101 (NO in Step S2602), the screen data combining section 2521 resumes the screen layer combination processing, and sets the operation mode thereof to the combination start mode (Step S2605).

Figure 18:
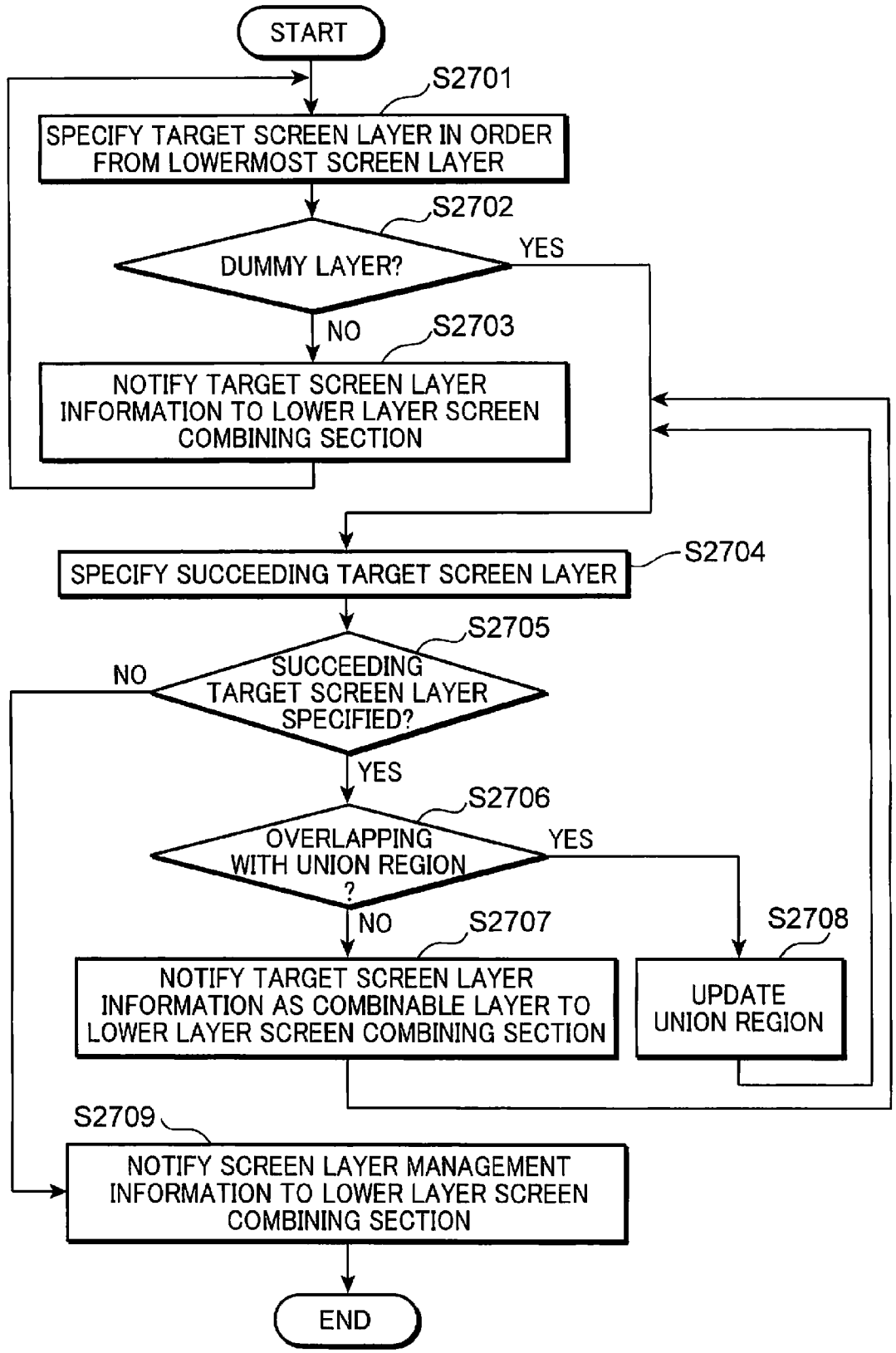
FIG. 18 is a flowchart showing a processing to be performed in the case where an upper layer/lower layer determining section acquires screen layer management information from the screen data combining section, and specifies pre-combinable screen layers.

FIG. 18 is a flowchart showing a processing to be performed in the case where the upper layer/lower layer determining section 2551 acquires screen layer management information from the screen data combining section 2521, and specifies pre-combinable screen layers.

Firstly, the upper layer/lower layer determining section 2551 specifies a target screen layer from the acquired screen layer management information in the order from a lowermost screen layer (Step S2701). Then, the upper layer/lower layer determining section 2551 determines whether the target screen layer is a dummy layer (Step S2702). Then, in the case where the target screen layer is not a dummy layer (NO in Step S2702), the upper layer/lower layer determining section 2551 sets the target screen layer as a pre-combinable screen layer, notifies the information relating to the target screen layer to the lower layer screen combining section 2552 (Step S2703); and then returns to Step S2701. By performing the above processing, a screen layer disposed at a lower position of a dummy layer is specified as a pre-combinable screen layer.

In this example, the screen layer information includes e.g. the display order, the coordinate, the size, and the memory buffer pointer shown in FIG. 5B.

On the other hand, in the case where the target screen layer is a dummy layer (YES in Step S2702), the upper layer/lower layer determining section 2551 specifies a succeeding screen layer as the target screen layer, referring to the screen layer management information 1441 (Step S2704). In this example, the succeeding screen layer indicates a screen layer at an upper position of the target screen layer in terms of the display order.

Then, the upper layer/lower layer determining section 2551 checks whether the succeeding screen layer has been acquired, in other words, whether there remains an un-specified screen layer (Step S2705).

Then, in the case where the upper layer/lower layer determining section 2551 could not specify the succeeding screen layer (NO in Step S2705), in other words, in the case where the uppermost screen layer among the screen layers to be managed by the screen layer management information 1441 has already been specified as the target screen layer, the upper layer/lower layer determining section 2551 notifies the lower layer screen combining section 2552 of the screen layer management information 1441 (Step S2709), and terminates the processing.

On the other hand, in the case where the upper layer/lower layer determining section 2551 could specify the succeeding screen layer (YES in Step S2705), the upper layer/lower layer determining section 2551 determines whether the target screen layer overlaps a union region between a dummy layer, and other screen layer of a non-secure virtual machine 102 that overlaps the dummy layer (Step S2706).

Figure 20A:
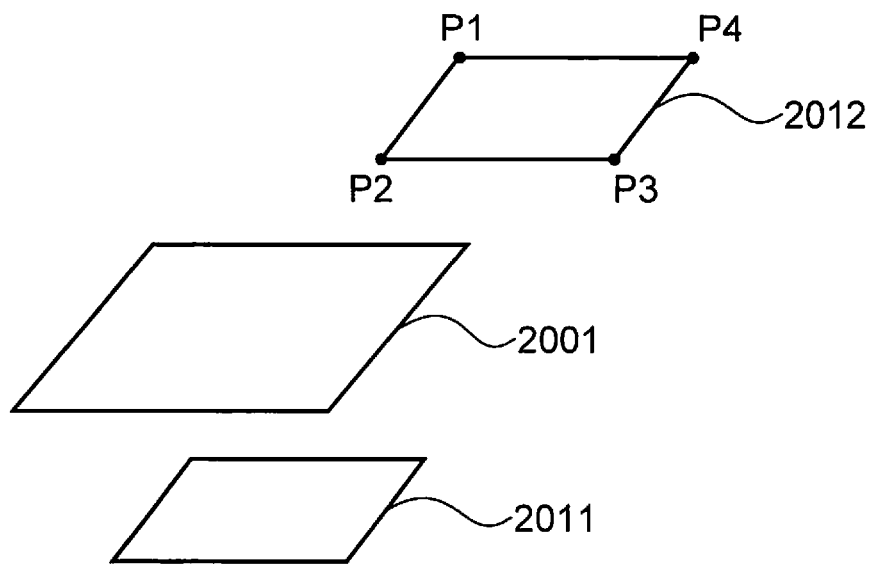
Figure 20B:
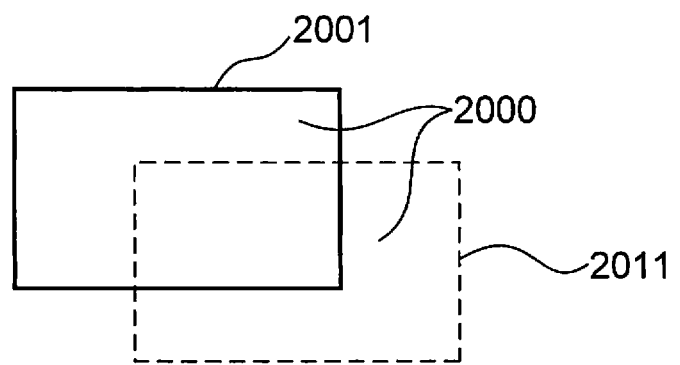

FIGS. 20A and 20B are explanatory diagrams of a union region, wherein FIG. 20A is a bird's eye view, and FIG. 20B is a top plan view. In the example shown in FIG. 20A, a screen layer 2011 of the non-secure virtual machine 102 is disposed as a lowermost layer, a dummy layer 2001 is disposed immediately above the screen layer 2011, and a target screen layer 2012 is disposed immediately above the dummy layer 2001.

In the above case, a union region 2000 is a region formed by a sum of the screen layer 2011 and the dummy layer 2001, as shown in FIG. 20B. Accordingly, in the case where at least one of four vertices P1 through P4 of the target screen layer 2012 is included in the union region 2000, it is determined that the target screen layer 2012 overlaps the union region 2000. On the other hand, in the case where none of the vertices P1 through P4 of the target screen layer 2012 is included in the union region 2000, it is determined that the target screen layer 2012 does not overlap the union region 2000.

Referring back to FIG. 18, in the case where it is determined that the target screen layer does not overlap the union region (NO in Step S2706), the upper layer/lower layer determining section 2551 sets the target screen layer as a combinable screen layer, notifies the information relating to the target screen layer to the lower layer screen combining section 2552 (Step S2707); and then returns to Step S2704.

On the other hand, in the case where it is determined that the target screen layer overlaps the union region (YES in Step S2706), the upper layer/lower layer determining section 2551 updates the union region by setting the sum of the target screen layer and the union region as a new union region (Step S2708), and returns to Step S2704. The updated union region is used in the determination processing in Step S2706 in the succeeding operation.

FIG. 19 is a flowchart showing a processing of pre-combining pre-combinable screen layers in the non-secure virtual machine 102 by the lower layer screen combining section 2552. The lower layer screen combining section 2552 acquires information relating to a screen layer that is determined to be pre-combinable by the upper layer/lower layer determining section 2551 (Step S2801).

The lower layer screen combining section 2552 combines pre-combinable screen layers in accordance with the acquired screen layer information (Step S2802). In this case, the lower layer screen combining section 2552 may cause a display combining engine 1002 to combine screen layers.

Then, the lower layer screen combining section 2552 generates information relating to a screen layer obtained by the combination (Step S2803). In this example, the screen layer information includes e.g. the display order, the coordinate, the size, and the memory buffer pointer shown in FIG. 5B.

Then, the lower layer screen combining section 2552 outputs, to a driver switching notification section 1341, the screen layer information generated in Step S2803, and information relating to an un-combined screen layer among the screen layers defined in the screen layer management information 1441 (Step S2804).

In the flowcharts shown in FIG. 17, FIG. 18 and FIG. 19, the screen layer management information 1441 is transferred between the screen data combining section 2521, the upper layer/lower layer determining section 2551 and the lower layer screen combining section 2552. Alternatively, the screen layer management information 1441 may be shared by a certain configuration. For instance, a shared memory 1031 may be provided with a region accessible by the upper layer/lower layer determining section 2551 and by the lower layer screen combining section 2552, and the screen layer management information 1441 may be stored in the region so that the upper layer/lower layer determining section 2551 and the lower layer screen combining section 2552 access the screen layer management information 1441.

FIG. 21 is a diagram showing a screen layer to be pre-combined by the lower layer screen combining section 2552. In the example shown in FIG. 21, screen layers 2111 and 2112 of the non-secure virtual machine 102 are placed one over the other in this order from the lowermost layer, a dummy layer 2101 is placed over the screen layer 2112, and screen layers 2113 and 2114 of the non-secure virtual machine 102 are placed one over the other in this order immediately above the dummy layer 2101.

In this example, although the screen layers 2111 and 2112 overlap the dummy layer 2101, the screen layers 2111 and 2112 are located at a lower position of the dummy layer 2101. Accordingly, the screen layers 2111 and 2112 are specified as pre-combinable screen layers.

Further, although the screen layers 2113 and 2114 are located at an upper position of the dummy layer 2101, the screen layers 2113 and 2114 do not overlap the dummy layer 2101, and the screen layers 2111 and 2112 that overlap the dummy layer 2101. Accordingly, the screen layers 2113 and 2114 are specified as pre-combinable screen layers.

Then, the lower layer screen combining section 2552 pre-combines the screen layers 2111, 2112, 2113 and 2114 into one screen layer, and writes screen data representing the one screen layer obtained by the combination into the shared memory 1031. Then, the lower layer screen combining section 2552 notifies the driver switching notification section 1341 of the information relating to the pre-combined screen layer.

On the other hand, the screen data combining section 1331 acquires the information relating to the pre-combined screen layer from the driver switching notification section 1341, and reads out, from the shared memory 1031, the screen data representing the pre-combined screen layer from the acquired screen layer information. Then, the screen data combining section 1331 sets the pre-combined screen layer as a lowermost layer, and combines the pre-combined screen layer and a screen layer of the secure virtual machine 101, using the screen layer management information of the secure virtual machine 101.

Accordingly, even in the case where each respective screen layer has a certain transmittance, the screen data combining section 1331 is capable of reproducing a semi-transparent screen in accordance with the transmittance of each respective screen layer.

As described above, in the second embodiment, it is possible to complete a screen layer combination in advance, which does not depend on a screen layer updating of the secure virtual machine 101, before the screen data combining section 1331 starts a screen layer combination. Thus, the second embodiment is advantageous in minimizing the processing load and the processing time of the screen data combining section 1331 in the secure virtual machine 101, in addition to the effect obtained in the first embodiment.

The functional blocks shown in FIG. 4 according to the first embodiment of the invention and the functional blocks shown in FIG. 16 according to the second embodiment of the invention are typically implemented as a program to be processed by cooperation of a processor and an external memory. The functional blocks, however, may be configured by an LSI, which is an integrated circuit. These functional blocks may be individually formed into a one-chip device, or a part or all of the functional blocks may be formed into a one-chip device. In this example, the integrated circuit is an LSI. The integrated circuit may also be called as an IC, a system LSI, a super LSI or an ultra LSI, depending on the degree of integration.

Further alternatively, the method of manufacturing the integrated circuit is not limited to an LSI method. The integrated circuit may be implemented by a dedicated circuit or a general-purpose processor. After fabricating an LSI, an FPGA (Field Programmable Gate Array) capable of programming, or a reconfigurable processor capable of reconfiguring connection or setting of circuit cells within the LSI may also be used.

Further, if an integration circuit technology substantially equivalent to the LSI technology is developed in the future by the progress of semiconductor technology or by another technology derived from the semiconductor technology, it is needless to say that the functional blocks may be integrated using such technology.

As far as an information processing system is provided with a processor and a memory, the invention may be applicable to all kinds of electronic devices, information devices, AV devices, communication devices, and household electrical appliances. It is easily comprehensible that the invention may also be applied to e.g. PCs (person computers), mobile information terminals such as mobile phones, smart phones or PDAs, televisions, hard disk recorders, various disc recorders or various disc players for DVDs or Blu-ray discs, and car navigation systems.

The foregoing description is merely an example of the invention in every aspect, and does not limit the scope of the invention. It is needless to say that various improvements or modifications may be implemented, as far as such improvements or modifications do not depart from the scope of the invention hereinafter defined.

The following is a summary of the technical features of the virtual machine display device.

(1) The aforementioned virtual machine display device is a virtual machine display device including a first virtual machine, a second virtual machine, a virtual machine controller which controls the first and second virtual machines, a first memory which holds screen data representing a screen layer of the first virtual machine, and a second memory which holds screen data representing a screen layer of the second virtual machine, the virtual machine display device adapted to combine screen layers of the first and second virtual machines for displaying a combined screen on a display device. The first virtual machine includes a dummy layer generating section which, in the case where a screen layer of the second virtual machine is generated, generates a dummy layer for managing the generated screen layer by the first virtual machine; a display layer management section which manages screen layer management information including at least a display order of screen layers of the first virtual machine and the dummy layer; a display driver switching section which switches display control to the first virtual machine in the case where the dummy layer is not generated, and switches the display control to the second virtual machine in the case where at least the one dummy layer is generated; and a first screen data combining section which combines screen layers of the first virtual machine, using the screen data held in the first memory, based on the screen layer management information in the case where the display driver switching section switches the display control to the first virtual machine. The virtual machine controller includes a driver switching notification section which designates the second virtual machine to combine screen layers in the case where the display driver switching section switches the display control to the second virtual machine. The second virtual machine includes a second screen data combining section which combines the screen layers of the first and second virtual machines, using the screen data held in the first and second memories, based on the screen layer management information, in the case where the driver switching notification section designates the second virtual machine to combine the screen layers.

In the above configuration, in the case where the number of dummy layers is zero, in other words, in the case where a screen layer of the second virtual machine is not generated, the display control is performed by the first virtual machine, and all the screen layers are combined by the first virtual machine.

Accordingly, even if a screen layer of the first virtual machine is frequently generated or disappears, as far as a screen layer of the second virtual machine is not generated, combination of screen layers is performed only by the first virtual machine. This eliminates the need of notifying generation and disappearance of a screen layer from the first virtual machine to the second virtual machine via the virtual machine controller, thereby preventing degradation of the drawing performance.

Further, the first virtual machine performs the display control only when a dummy layer is not generated, and once a dummy layer is generated, the display control is switched to the second virtual machine.

In the above configuration, the first virtual machine is allowed to access only the first memory to read out screen data representing a screen layer held in the first memory for screen layer combination. Thus, the above configuration prevents the first virtual machine from accessing the second memory.

On the other hand, once a dummy layer is generated, the display control is switched from the first virtual machine to the second virtual machine. Then, the second virtual machine replaces the dummy layer with a screen layer of the second virtual machine, referring to the screen layer management information, and combines screen layers in the display order described in the screen layer management information. Thus, it is possible to place the screen layers of the first and second virtual machines one over the other in the proper display order.

(2) Preferably, in the case where a screen layer of the second virtual machine has disappeared, the dummy layer generating section may cause the display layer management section to update the screen layer management information in such a manner that a dummy layer corresponding to the disappeared screen layer is erased.

In the above configuration, in the case where a screen layer of the second virtual machine has disappeared, it is possible to erase, from the display screen layer management information, the dummy layer corresponding to the disappeared screen layer in association with the disappearance. Thereby, the display layer management section is allowed to accurately manage disappearance of a dummy layer.

(3) Preferably, the display device may generate a drawing interrupt, and the virtual machine display device may further include an interrupt delivery control section which delivers the drawing interrupt to the second virtual machine so that the second virtual machine causes the second screen data combining section to combine screen layers, in the case where the display driver switching section switches the display control to the second virtual machine, and delivers the drawing interrupt to the first virtual machine so that the first virtual machine causes the first screen data combining section to combine screen layers, in the case where the display driver switching section switches the display control to the first virtual machine.

In the above configuration, in the case where the display control is switched to the second virtual machine, the drawing interrupt is delivered to the second virtual machine, and in the case where the display control is switched to the first virtual machine, the drawing interrupt is delivered to the first virtual machine. Accordingly, in a configuration of allowing screen layer combination using a drawing interrupt as a trigger, it is possible to cause the second virtual machine to combine screen layers once there is generated at least one dummy layer, and to cause the first virtual machine to combine screen layers if the number of dummy layers is zero.

(4) Preferably, the dummy layer generating section may notify the display driver switching section of generation and erasing of the dummy layer, and the display driver switching section may manage the number of generated dummy layers in such a manner that the number of generated dummy layers is incremented by one in the case where generation of a dummy layer is notified from the dummy layer generating section, and the number of generated dummy layers is decremented by one in the case where erasing of a dummy layer is notified from the dummy layer generating section.

In the above configuration, the display driver switching section is operable to manage the number of generated dummy layers in association with generation and erasing of a dummy layer. Thus, the display driver switching section is allowed to securely perform a display control switching operation.

(5) Preferably, the screen layer management information may include dummy layer information indicating as to whether each respective screen layer is the dummy layer.

In the above configuration, it is possible to accurately manage which screen layer corresponds to a dummy layer in the screen layer management information.

(6) Preferably, the second screen data combining section may specify the dummy layer from the screen layer management information, and combine screen layers by replacing the specified dummy layer with screen data representing a screen layer corresponding to the specified dummy layer.

In the above configuration, the first virtual machine causes the second screen data combining section to combine screen layers only by managing a screen layer of the second virtual machine as a dummy layer. Thus, the above configuration eliminates the need of causing the first virtual machine to access the second memory.

(7) Preferably, the screen layer management information may include a size of each respective screen layer and a storage address of screen data representing the each respective screen layer.

In the above configuration, the first and second screen data combining sections are allowed to recognize the size of each respective screen layer and the storage address of screen data representing the each respective screen layer from the screen layer management information.

(8) Preferably, the first screen data combining section may specify screen layers of the first virtual machine which are located at a lower position of the dummy layer in terms of the display order, as pre-combinable screen layers, based on the screen layer management information, in the case where the display driver switching section switches the display control to the second virtual machine, and combine the specified screen layers; and the second screen data combining section may combine a screen layer that has been pre-combined by the first screen data combining section, and the rest of the screen layers, based on the screen layer management information.

In the above configuration, the first screen data combining section pre-combines screen layers of the first virtual machine which are located at a lower position of the dummy layer, and the second screen data combining section combines the rest of the screen layers. By performing the above operation, even if screen data has information relating to a transmittance, the second screen data combining section is operable to draw a semi-transparent screen in accordance with the transmittance, and is operable to reduce the processing load and the processing time of the second screen data combining section.

(9) Preferably, the first screen data combining section may obtain a union region between the dummy layer, and a screen layer of the first virtual machine that overlaps the dummy layer, may further specify screen layers that do not overlap the union region, as pre-combinable screen layers, the screen layers being screen layers of the first virtual machine located at an upper position of the dummy layer in terms of the display order, and may combine the specified screen layers.

In the above configuration, even in the case where screen layers of the first virtual machine are located at an upper position of the dummy layer, the screen layers are specified as pre-combinable screen layers, as far as the screen layers do not overlap the union region, and the pre-combinable screen layers are combined by the first screen data combining section. Thus, it is possible to increase the number of pre-combinable screen layers, thereby further reducing the processing time and the processing load of the second screen data combining section.

(10) Preferably, the first memory may be a shared memory accessible by the first and second virtual machines, and the second memory may be a non-shared memory accessible only by the second virtual machine.

In the above configuration, even in the case where the first memory is a shared memory accessible by the first and second virtual machines, and the second memory is a non-shared memory only accessible by the second virtual machine, the advantages described in (1) can be obtained.

INDUSTRIAL APPLICABILITY

The virtual machine display device of the invention is capable of preventing a non-secure virtual machine from accessing a screen of a secure virtual machine, while minimizing a time required for a combination processing, in the case where screen layers to be outputted from different virtual machines are combined. Thus, the invention is useful for devices loaded with a computer, such as information devices, AV devices, communication devices, and household electric appliances.

The invention claimed is:

1. A virtual machine display device, comprising:
a first virtual machine, a second virtual machine, a virtual machine controller which controls the first and second virtual machines, a first memory which holds screen data representing a screen layer of the first virtual machine, and a second memory which holds screen data representing a screen layer of the second virtual machine, the virtual machine display device adapted to combine screen layers of the first and second virtual machines for displaying a combined screen on a display device,
the first virtual machine including:
a dummy layer generating section which, in the case where a screen layer of the second virtual machine is generated, generates a dummy layer for managing the generated screen layer by the first virtual machine;
a display layer management section which manages screen layer management information including at least a display order of screen layers of the first virtual machine and the dummy layer;
a display driver switching section which switches display control to the first virtual machine in the case where the dummy layer is not generated, and switches the display control to the second virtual machine in the case where at least the one dummy layer is generated; and a first screen data combining section which combines screen layers of the first virtual machine, using the screen data held in the first memory, based on the screen layer management information in the case where the display driver switching section switches the display control to the first virtual machine, wherein the virtual machine controller includes a driver switching notification section which designates the second virtual machine to combine screen layers in the case where the display driver switching section switches the display control to the second virtual machine, and the second virtual machine includes a second screen data combining section which combines the screen layers of the first and second virtual machines, using the screen data held in the first and second memories, based on the screen layer management information, in the case where the driver switching notification section designates the second virtual machine to combine the screen layers.

2. The virtual machine display device according to claim 1, wherein in the case where a screen layer of the second virtual machine has disappeared, the dummy layer generating section causes the display layer management section to update the screen layer management information in such a manner that a dummy layer corresponding to the disappeared screen layer is erased.

3. The virtual machine display device according to claim 1, wherein the display device generates a drawing interrupt, and the virtual machine display device further includes an interrupt delivery control section which delivers the drawing interrupt to the second virtual machine so that the second virtual machine causes the second screen data combining section to combine screen layers, in the case where the display driver switching section switches the display control to the second virtual machine, and delivers the drawing interrupt to the first virtual machine so that the first virtual machine causes the first screen data combining section to combine screen layers, in the case where the display driver switching section switches the display control to the first virtual machine.

4. The virtual machine display device according to claim 1, wherein the dummy layer generating section notifies the display driver switching section of generation and erasing of the dummy layer, and the display driver switching section manages the number of generated dummy layers in such a manner that the number of generated dummy layers is incremented by one in the case where generation of a dummy layer is notified from the dummy layer generating section, and the number of generated dummy layers is decremented by one in the case where erasing of a dummy layer is notified from the dummy layer generating section.

5. The virtual machine display device according to claim 1, wherein the screen layer management information includes dummy layer information indicating as to whether each respective screen layer is the dummy layer.

6. The virtual machine display device according to claim 1, wherein the second screen data combining section specifies the dummy layer from the screen layer management information, and combines screen layers by replacing the specified dummy layer with screen data representing a screen layer corresponding to the specified dummy layer.

7. The virtual machine display device according to claim 1, wherein the screen layer management information includes a size of each respective screen layer and a storage address of screen data representing the each respective screen layer.

8. The virtual machine display device according to claim 1, wherein the first screen data combining section specifies screen layers of the first virtual machine which are located at a lower position of the dummy layer in terms of the display order, as pre-combinable screen layers, based on the screen layer management information, in the case where the display driver switching section switches the display control to the second virtual machine, and combines the specified screen layers, and the second screen data combining section combines a screen layer that has been pre-combined by the first screen data combining section, and the rest of the screen layers, based on the screen layer management information.

9. The virtual machine display device according to claim 8, wherein the first screen data combining section obtains a union region between the dummy layer, and a screen layer of the first virtual machine that overlaps the dummy layer, further specifies screen layers that do not overlap the union region, as pre-combinable screen layers, the screen layers being screen layers of the first virtual machine located at an upper position of the dummy layer in terms of the display order, and combines the specified screen layers.

10. The virtual machine display device according to claim 1, wherein the first memory is a shared memory accessible by the first and second virtual machines, and the second memory is a non-shared memory accessible only by the second virtual machine.

11. A virtual machine display method for displaying a combined screen on a display device by a virtual machine display device provided with a first virtual machine, a second virtual machine, a virtual machine controller which controls the first and second virtual machines, a first memory which holds screen data representing a screen layer of the first virtual machine, and a second memory which holds screen data representing a screen layer of the second virtual machine, the virtual machine display device adapted to combine screen layers of the first and second virtual machines into the combined screen, the first virtual machine including:

a dummy layer generating step of, in the case where a screen layer of the second virtual machine is generated, generating a dummy layer for managing the generated screen layer by the first virtual machine;

a display layer management step of managing screen layer management information including at least a display order of screen layers of the first virtual machine and the dummy layer;

a display driver switching step of switching display control to the first virtual machine in the case where the dummy layer is not generated, and switching the display control to the second virtual machine in the case where at least the one dummy layer is generated; and a first screen data combining step of combining screen layers of the first virtual machine, using the screen data held in the first memory, based on the screen layer management information in the case where the display control is switched to the first virtual machine in the display driver switching step, the virtual machine controller including:

a driver switching notification step of designating the second virtual machine to combine screen layers in the case where the display control is switched to the second virtual machine in the display driver switching step, the second virtual machine including:

a second screen data combining step of combining the screen layers of the first and second virtual machines, using the screen data held in the first and second memories, based on the screen layer management information in the case where combining the screen layers by the second virtual machine is designated in the driver switching notification step.

12. A non-transitory computer-readable recording medium which records a virtual machine display program causing a computer to function as a virtual machine display device provided with a first virtual machine, a second virtual machine, a virtual machine controller which controls the first and second virtual machines, a first memory which holds screen data representing a screen layer of the first virtual machine, and a second memory which holds screen data representing a screen layer of the second virtual machine, the virtual machine display device adapted to combine screen layers of the first and second virtual machines for displaying a combined screen on a display device, the program causing the first virtual machine to function as:

a dummy layer generating section which, in the case where a screen layer of the second virtual machine is generated, generates a dummy layer for managing the generated screen layer by the first virtual machine;

a display layer management section which manages screen layer management information including at least a display order of screen layers of the first virtual machine and the dummy layer;

a display driver switching section which switches display control to the first virtual machine in the case where the dummy layer is not generated, and switches the display control to the second virtual machine in the case where at least the one dummy layer is generated; and a first screen data combining section which combines screen layers of the first virtual machine, using the screen data held in the first memory, based on the screen layer management information in the case where the display driver switching section switches the display control to the first virtual machine, the program causing the virtual machine controller to function as a driver switching notification section which designates the second virtual machine to combine screen layers in the case where the display driver switching section switches the display control to the second virtual machine, and the program causing the second virtual machine to function as a second screen data combining section which combines the screen layers of the first and second virtual machines, using the screen data held in the first and second memories, based on the screen layer management information in the case where the driver switching notification section designates the second virtual machine to combine the screen layers.

13. An integrated circuit of a virtual machine display device, comprising:

a first virtual machine, a second virtual machine, a virtual machine controller which controls the first and second virtual machines, a first memory which holds screen data representing a screen layer of the first virtual machine, and a second memory which holds screen data representing a screen layer of the second virtual machine, the virtual machine display device adapted to combine screen layers of the first and second virtual machines for displaying a combined screen on a display device, the first virtual machine including:

a dummy layer generating section which, in the case where a screen layer of the second virtual machine is generated, generates a dummy layer for managing the generated screen layer by the first virtual machine;

a display layer management section which manages screen layer management information including at least a display order of screen layers of the first virtual machine and the dummy layer;

a display driver switching section which switches display control to the first virtual machine in the case where the dummy layer is not generated, and switches the display control to the second virtual machine in the case where at least the one dummy layer is generated; and a first screen data combining section which combines screen layers of the first virtual machine, using the screen data held in the first memory, based on the screen layer management information in the case where the display driver switching section switches the display control to the first virtual machine, the virtual machine controller including:

a driver switching notification section which designates the second virtual machine to combine screen layers in the case where the display driver switching section switches the display control to the second virtual machine, and the second virtual machine including:

a second screen data combining section which combines the screen layers of the first and second virtual machines, using the screen data held in the first and second memories, based on the screen layer management information in the case where the driver switching notification section designates the second virtual machine to combine the screen layers.

* * * * *